US012572850B2

(12) United States Patent
Si et al.

(10) Patent No.: US 12,572,850 B2
(45) Date of Patent: Mar. 10, 2026

(54) METHOD FOR IMPLEMENTING MODEL UPDATE AND DEVICE THEREOF

(71) Applicant: HUAWEI TECHNOLOGIES CO., LTD., Shenzhen (CN)

(72) Inventors: Xiaoyun Si, Nanjing (CN); Liang Zhang, Nanjing (CN); Xinyu Hu, Nanjing (CN); Jun Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 825 days.

(21) Appl. No.: 17/871,084

(22) Filed: Jul. 22, 2022

(65) Prior Publication Data

US 2022/0366310 A1     Nov. 17, 2022

Related U.S. Application Data

(63) Continuation of application No. PCT/CN2020/119432, filed on Sep. 30, 2020.

(51) Int. Cl.
*G06N 20/00*          (2019.01)

(52) U.S. Cl.
CPC .................................... *G06N 20/00* (2019.01)

(58) Field of Classification Search
CPC ......... G06N 20/00; G06N 3/098; G06N 20/20
See application file for complete search history.

(56) References Cited

U.S. PATENT DOCUMENTS

2018/0307748 A1    10/2018  Freilinger et al.
2019/0114537 A1*    4/2019  Wesolowski ........... G06N 3/084
(Continued)

FOREIGN PATENT DOCUMENTS

CN          110008696 A      7/2019
CN          110197084 A      9/2019
(Continued)

OTHER PUBLICATIONS

Yao et al. (Federated Learning with Additional Mechanisms on Clients to Reduce Communication Costs, arXiv, published 2019, pp. 1-12). (Year: 2019).*
(Continued)

*Primary Examiner* — Tan H Tran
(74) *Attorney, Agent, or Firm* — Maier & Maier, PLLC

(57) ABSTRACT

A method for implementing model update is provided and used in a federated update framework. The method includes: a service device receives difference information uploaded by at least two clients. The service device performs calculation based on the difference information uploaded by the at least two clients, to obtain first difference consistency information, where the first difference consistency information indicates a consistency degree of the difference information uploaded by the at least two clients. The service device performs calculation based on the first difference consistency information, to obtain first training information, where the first training information is used to train a third model, and the third model is obtained by updating the first model by the service device based on the difference information uploaded by the at least two clients. The service device sends the first training information to the at least two clients.

20 Claims, 7 Drawing Sheets

(56) References Cited

U.S. PATENT DOCUMENTS

2022/0108177 A1*  4/2022  Samek  ................... G06N 3/045
2022/0164661 A1*  5/2022  Uehara  ................. G06N 3/044

FOREIGN PATENT DOCUMENTS

CN       110598870 A    12/2019
CN       110719158 A     1/2020

OTHER PUBLICATIONS

Mcmahan et al., "Communication-Efficient Learning of Deep Networks from Decentralized Data", arXiv:1602.05629v3, [cs.LG], Feb. 28, 2017, 11 pages.
Mccandlish et al., "An Empirical Model of Large-Batch Training", arxiv. org, Cornell University Library, 201 Olin Library Cornell University Ithaca, NY 14853, Dec. 14, 2018, 35 pages.
Yin et al., "Gradient Diversity: a Key Ingredient for Scalable Distributed Learning", arxiv. org, Cornell University Library, 201 Olin Library Cornell University Ithaca, NY 14853, Jan. 7, 2018, 32 pages.
Johnson et al., "AdaScale SGD: A User-Friendly Algorithm for Distributed Training", arxiv. org, Cornell University Library, 201 Olin Library Cornell University Ithaca, NY 14853, Jul. 9, 2020, 17 pages.

* cited by examiner

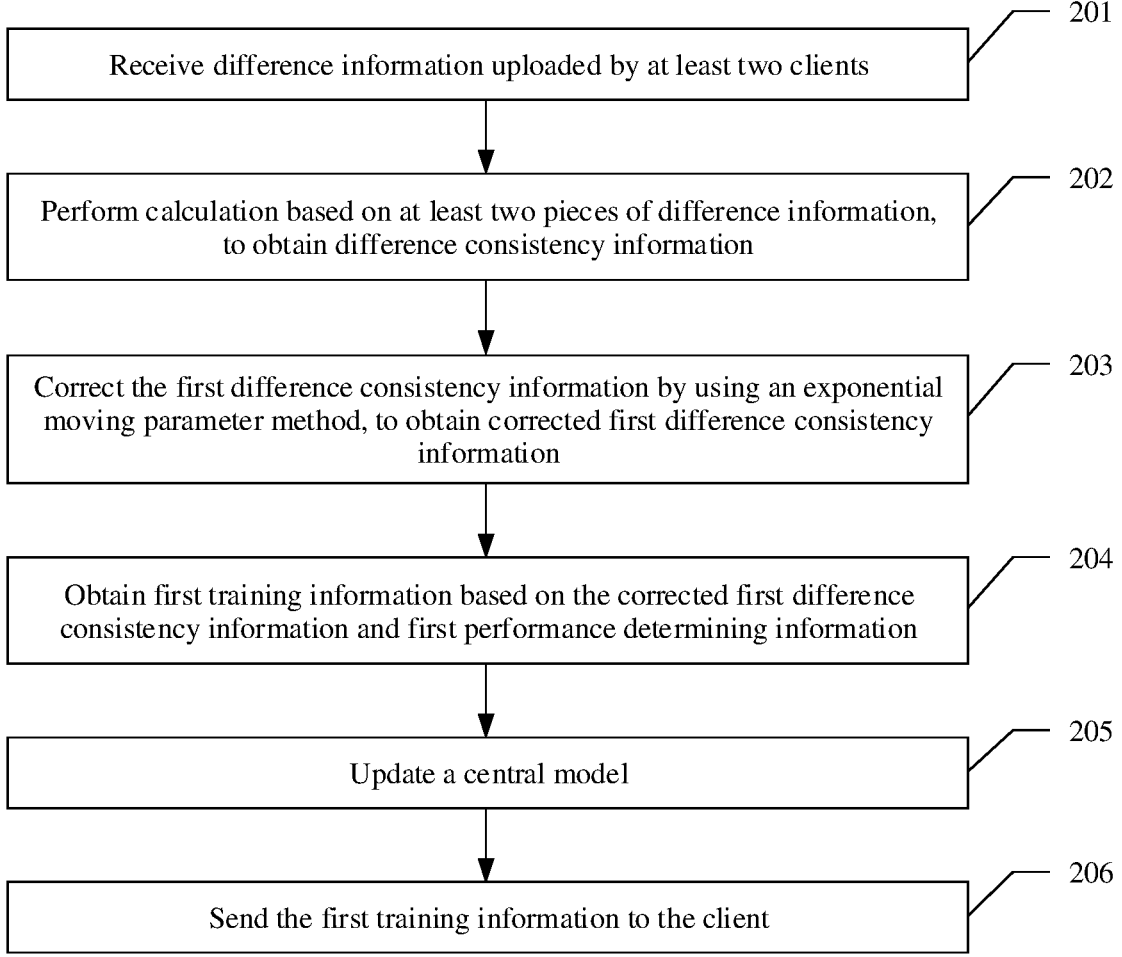

Receive difference information uploaded by at least two clients — 201

Perform calculation based on at least two pieces of difference information, to obtain difference consistency information — 202

Correct the first difference consistency information by using an exponential moving parameter method, to obtain corrected first difference consistency information — 203

Obtain first training information based on the corrected first difference consistency information and first performance determining information — 204

Update a central model — 205

Send the first training information to the client — 206

METHOD FOR IMPLEMENTING MODEL UPDATE AND DEVICE THEREOF

CROSS-REFERENCE TO RELATED APPLICATIONS

This application is a continuation of International Application No. PCT/CN2020/119432, filed on Sep. 30, 2020, which claims priority to Chinese Patent Application No. 202010077143.8, filed on Jan. 23, 2020. The disclosures of the aforementioned applications are hereby incorporated by reference in their entireties.

TECHNICAL FIELD

The embodiments relate to the field of computers, a method for implementing model update, and a device thereof.

BACKGROUND

Federated learning (FL) is an emerging artificial intelligence basic technology and is originally used to resolve a problem in updating a model locally by an end user. Federated learning is designed to protect terminal data and personal data privacy and perform efficient machine learning between a plurality of participants or a plurality of computing nodes. Currently, the purpose of federated learning is to jointly build an artificial intelligence (AI) model without sharing data, to improve an effect of the AI model.

In a federated learning process, each client performs training locally by using local data, and uploads difference information of a trained local model to a service device. The service device then performs federated update on the uploaded difference information of the local model trained by each client, to generate a new central model, and delivers the new model to the client. The client performs training locally again based on the new model, and uploads models trained in a plurality of batches to the service device. After several such repeated processes, the service device converges the central model, indicating that this federated learning is completed.

After the service device receives the difference information uploaded by the client, the service device delivers some training information for next training, for example, a quantity of training batches or a learning rate. However, the delivered training information is previously set by the service device, for example, is fixed, or the training information for next training is set according to an ascending rule or a descending rule. However, each time the client updates the trained model, optimal time for uploading a model after the client performs training on the updated model is related to a previous training result. If the training information does not correspondingly change, or the service device sets corresponding training information only in an ascending or descending manner, the client may miss an optimal upload occasion. In this case, accuracy of model training is affected.

SUMMARY

The embodiments may provide a method for implementing model update and an apparatus thereof, used to obtain first training information based on difference information of at least two clients, so that accuracy of model training can be improved when a client performs training by using the first training information.

According to a first aspect, an embodiment may provide a method for implementing a model update.

During federated training, when completing training, a client sends difference information to a service device. The service device may receive at least two pieces of difference information sent by at least two clients. The difference information is difference information that is of a second model relative to a first model and obtained by the client through training based on the first model, and the first model is sent by the service device to the client.

The service device performs calculation based on the difference information uploaded by the at least two clients, to obtain first difference consistency information. The first difference consistency information indicates a consistency degree of the difference information uploaded by the at least two clients.

After receiving the difference information uploaded by the at least two clients, the service device updates the first model based on the difference information uploaded by the at least two clients, to obtain a third model.

The service device performs calculation based on the first difference consistency information, to obtain first training information, where the first training information is used by the client to train the third model.

After obtaining the first training information, the service device sends the first training information and the third model to the at least two clients.

In this embodiment, the service device may perform calculation based on the difference information uploaded by the at least two clients, to obtain the first training information, and delivers the first training information to the client. When the client trains the third model based on the first training information, because the first training information is obtained through calculation based on previous difference information, accuracy of model training can be improved when the client performs training by using the first training information.

In a first implementation of the first aspect of this embodiment, the service device may obtain the first difference consistency information through calculation according to the following formula:

$$GCR_t = \frac{\left| \sum_i g_i \right|}{\sum_i |g_i|}.$$

$GCR_t$ indicates the first difference consistency information, $g_i$ indicates difference information uploaded by an $i^{th}$ client in the at least two clients, and i is a positive integer greater than or equal to 1.

In this embodiment, the service device calculates the first difference consistency information according to a formula to improve feasibility of the solution.

In a second implementation of the first aspect of this embodiment, the first training information includes at least one of a first quantity of training batches or a first learning rate, the first quantity of training batches is used by the client to determine a quantity of training batches, and the first learning rate is used by the client to determine a training learning rate when training the model.

In this embodiment, information included in the first training information is limited to improve feasibility of the solution.

In a third implementation of the first aspect of this embodiment, if the first training information includes the first quantity of training batches, the first training information obtained by the service device through calculation based on the first difference consistency information needs to meet the following condition:

$$\text{if } GCR_t < GCR_{t-1}, E_t < E_{t-1};$$

$$\text{if } GCR_t = GCR_{t-1}, E_t = E_{t-1}; \text{ or}$$

$$\text{if } GCR_t > GCR_{t-1}, E_t > E_{t-1}.$$

$GCR_{t-1}$ indicates second difference consistency information, the second difference consistency information is difference consistency information obtained by the service device through calculation before the service device obtains the first difference consistency information, $GCR_t$ indicates the first difference consistency information, $E_{t-1}$ indicates a second quantity of training batches, the second quantity of training batches indicates a quantity of training batches delivered by the service device to the client before the service device obtains the first quantity of training batches, and $E_t$ indicates the first quantity of training batches.

In this embodiment, a condition for calculating the first training information by the service device is limited to improve feasibility of the solution.

In a fourth implementation of the first aspect of this embodiment, if the first training information includes the first learning rate, the first learning rate obtained by the service device through calculation based on the first difference consistency information needs to meet the following condition:

$$\text{if } GCR_t < GCR_{t-1}, lr_t < lr_{t-1};$$

$$\text{if } GCR_t = GCR_{t-1}, lr_t = lr_{t-1}; \text{ or}$$

$$\text{if } GCR_t > GCR_{t-1}, lr_t > lr_{t-1}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates a second learning rate, the second learning rate is a learning rate delivered by the service device to the client before the service device obtains the first learning rate, and $lr_t$ indicates the first learning rate.

In this embodiment, a condition for calculating the first learning rate by the service device is limited to improve feasibility of the solution.

In a fifth implementation of the first aspect of this embodiment, the service device may perform calculation based on the first difference consistency information and first performance determining information, to obtain the first training information. The first performance determining information indicates a weight of a performance determining factor used when the service device calculates the first training information.

In this embodiment, the first training information is obtained through calculation based on the first performance determining information, to improve feasibility of the solution.

In a sixth implementation of the first aspect of this embodiment, the first performance determining information includes at least one of an accuracy weight and a communication cost weight, the accuracy weight indicates a weight of model accuracy set when the service device calculates the first training information, and the communication cost weight indicates a weight of a communication resource used when the service device calculates the first training information.

In this embodiment, an accuracy weight and a communication cost weight are limited. When the first training information is calculated, the accuracy weight and the communication cost weight may be set based on actual application, to improve operability of the solution.

In a seventh implementation of the first aspect of this embodiment, if the first training information includes the first quantity of training batches, and the first determining performance information includes the accuracy weight and the communication cost weight, the service device may calculate the first quantity of training batches according to the following formula:

$$E_t = \begin{cases} \alpha \times \dfrac{E_{t-1} + a}{b} + \beta \times E_{t-1} & GCR_t < GCR_{t-1} \\ E_{t-1} & GCR_t = GCR_{t-1} \\ c\alpha \times E_{t-1} + d\beta \times E_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $E_{t-1}$ indicates the second quantity of training batches, the second training batch information indicates a quantity of training batches sent by the service device to the client last time, $E_t$ indicates the first training batch information, $\alpha$ indicates the accuracy weight, $\beta$ indicates the communication cost weight, and a, b, c, and d are positive numbers not greater than 6.

If $E_t$ obtained through calculation according to the formula is a non-positive integer, a value of $E_t$ is rounded to a positive integer.

In this embodiment, the first quantity of training batches is calculated according to a formula to improve feasibility of the solution.

In an eighth implementation of the first aspect of this embodiment, if the first training information includes the first learning rate, the service device may calculate the first learning rate according to the following formula:

$$lr_t = \begin{cases} a_1\alpha \times lr_{t-1} + \beta \times lr_{t-1} & GCR_t < GCR_{t-1} \\ lr_{t-1} & GCR_t = GCR_{t-1} \\ b_1\alpha \times lr_{t-1} + b_2\beta \times lr_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates the second learning rate, the second learning rate is a learning rate delivered by the service device to the client before the service device obtains the first learning rate, $lr_t$ indicates the first learning rate, $\alpha$ indicates the accuracy weight, $\beta$ indicates the communication cost weight, and $a_1$, $b_1$, and $b_2$ are positive numbers not greater than 6.

In this embodiment, the first learning rate is calculated according to a formula to improve feasibility of the solution.

In a ninth implementation of the first aspect of this embodiment, after obtaining the first difference consistency information through calculation, the service device may correct the first difference consistency information by using an exponential moving average method, to obtain corrected first difference consistency information.

In this embodiment, the first difference consistency information is corrected by using the exponential moving average method, and the first training information is calculated based on the corrected first difference consistency information to improve accuracy of model training.

In a tenth implementation of the first aspect of this embodiment, the service device may correct the first difference consistency information according to the following formula:

$$GCR'=GCR_{t-1}*\partial+GCR_t*(1-\partial).$$

$GCR_{t-1}$ indicates the second difference consistency information, the second difference consistency information is difference consistency information obtained by the service device through calculation before the service device obtains the first difference consistency information, $GCR_t$ indicates the first difference consistency information, and GCR' indicates the corrected first difference consistency information.

A value of $\partial$ ranges from 0.9 to 0.99.

In this embodiment, the first difference consistency information is corrected according to a formula to improve feasibility of the solution.

In an eleventh implementation of the first aspect of this embodiment, the value of a is 0.95.

In this embodiment, feasibility of the solution is improved by limiting a value of $\partial$.

According to a second aspect, an embodiment may provide a method for implementing model update.

During federated training, a service device receives difference information uploaded by at least two clients. Difference information uploaded by any one of the at least two clients is difference information that is of a second model relative to a first model and obtained through training based on the first model, and the first model is received by the client from the service device.

The service device updates the first model, namely, a central model of the service device, based on the difference information uploaded by the at least two clients, to obtain a third model.

The service device obtains difference information (referred to as difference information of the service device) between the first model and the third model based on the first model and the third model.

The service device performs calculation based on the difference information of the service device and difference information uploaded by a first client of the at least two clients, to obtain target difference consistency information. The target difference consistency information indicates a consistency degree between the difference information of the service device and the difference information of the first client.

The service device performs calculation based on the target difference consistency information, to obtain target training information. The target training information is used by the client to train the third model.

The service device sends the target training information and the third model to the first client.

In this embodiment, training batch information of a single client is calculated separately to improve accuracy of model training.

In a first implementation of the second aspect of this embodiment, the first training information includes at least one of a first quantity of training batches or a first learning rate, the first quantity of training batches is used by the client to determine a quantity of training batches, and the first learning rate is used by the client to determine a training learning rate when training the model.

In this embodiment, information included in the first training information is limited to improve feasibility of the solution.

In a second implementation of the second aspect of this embodiment, if the first training information includes the first quantity of training batches, the first training information obtained by the service device through calculation based on the first difference consistency information needs to meet the following condition:

if $GCR_t<GCR_{t-1}, E_t<E_{t-1}$;

if $GCR_t=GCR_{t-1}, E_t=E_{t-1}$; or if $GCR_t>GCR_{t-1}, E_t>E_{t-1}$.

$GCR_{t-1}$ indicates second difference consistency information, the second difference consistency information is difference consistency information obtained by the service device through calculation before the service device obtains the first difference consistency information, $GCR_t$ indicates the first difference consistency information, $E_{t-1}$ indicates a second quantity of training batches, the second quantity of training batches indicates a quantity of training batches delivered by the service device to the client before the service device obtains the first quantity of training batches, and $E_t$ indicates the first quantity of training batches.

In this embodiment, a condition for calculating the first training information by the service device is limited to improve feasibility of the solution.

In a third implementation of the second aspect of this embodiment, if the first training information includes the first learning rate, the first learning rate obtained by the service device through calculation based on the first difference consistency information needs to meet the following condition:

if $GCR_t<GCR_{t-1}, lr_t<lr_{t-1}$;

if $GCR_t=GCR_{t-1}, lr_t=lr_{t-1}$; or if $GCR_t>GCR_{t-1}, lr_t>lr_{t-1}$.

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates a second learning rate, the second learning rate is a learning rate delivered by the service device to the client before the service device obtains the first learning rate, and $lr_t$ indicates the first learning rate.

In this embodiment, a condition for calculating the first learning rate by the service device is limited to improve feasibility of the solution.

In a fourth implementation of the second aspect of this embodiment, the service device may perform calculation based on the first difference consistency information and first performance determining information, to obtain the first training information. The first performance determining information indicates a weight of a performance determining factor used when the service device calculates the first training information.

In this embodiment, the first training information is obtained through calculation based on the first performance determining information to improve feasibility of the solution.

In a fifth implementation of the second aspect of this embodiment, the first performance determining information includes at least one of an accuracy weight and a communication cost weight, the accuracy weight indicates a weight of model accuracy set when the service device calculates the first training information, and the communication cost weight indicates a weight of a communication resource used when the service device calculates the first training information.

In this embodiment, an accuracy weight and a communication cost weight are limited. When the first training information is calculated, the accuracy weight and the communication cost weight may be set based on actual application, to improve operability of the solution.

In a sixth implementation of the second aspect of this embodiment, if the first training information includes the first quantity of training batches, and the first determining performance information includes the accuracy weight and the communication cost weight, the service device may calculate the first quantity of training batches according to the following formula:

$$E_t = \begin{cases} \alpha \times \dfrac{E_{t-1}+a}{b} + \beta \times E_{t-1} & GCR_t < GCR_{t-1} \\ E_{t-1} & GCR_t = GCR_{t-1} \\ c\alpha \times E_{t-1} + d\beta \times E_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $E_{t-1}$ indicates the second training batch information, the second training batch information indicates a quantity of training batches sent by the service device to the client last time, $E_t$ indicates the first training batch information, $\alpha$ indicates the accuracy weight, $\beta$ indicates the communication cost weight, and a, b, c, and d are positive numbers not greater than 6.

If $E_t$ obtained through calculation according to the formula is a non-positive integer, a value of $E_t$ is rounded to a positive integer.

In this embodiment, the first quantity of training batches is calculated according to a formula to improve feasibility of the solution.

In a seventh implementation of the second aspect of this embodiment, if the first training information includes the first learning rate, the service device may calculate the first learning rate according to the following formula:

$$lr_t = \begin{cases} a_1\alpha \times lr_{t-1} + \beta \times lr_{t-1} & GCR_t < GCR_{t-1} \\ lr_{t-1} & GCR_t = GCR_{t-1} \\ b_1\alpha \times lr_{t-1} + b_2\beta \times lr_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates the second learning rate, the second learning rate is a learning rate delivered by the service device to the client before the service device obtains the first learning rate, $lr_t$ indicates the first learning rate, $\alpha_\alpha$ indicates the accuracy weight, $\beta$ indicates the communication cost weight, and $a_1$, $b_1$, and $b_2$ are positive numbers not greater than 6.

In this embodiment, the first learning rate is calculated according to a formula to improve feasibility of the solution.

In an eighth implementation of the second aspect of this embodiment, after obtaining the first difference consistency information through calculation, the service device may correct the first difference consistency information by using an exponential moving average method, to obtain corrected first difference consistency information.

In this embodiment, the first difference consistency information is corrected by using the exponential moving average method, and the first training information is calculated based on the corrected first difference consistency information, to improve accuracy of model training.

In a ninth implementation of the second aspect of this embodiment, the service device may correct the first difference consistency information according to the following formula:

$$GCR'=GCR_{t-1}*\partial+GCR_t*(1-\partial).$$

$GCR_{t-1}$ indicates the second difference consistency information, the second difference consistency information is difference consistency information obtained by the service device through calculation before the service device obtains the first difference consistency information, $GCR_t$ indicates the first difference consistency information, and GCR' indicates the corrected first difference consistency information.

A value of $\partial$ ranges from 0.9 to 0.99.

In this embodiment, the first difference consistency information is corrected according to a formula to improve feasibility of the solution.

In a tenth implementation of the second aspect of this embodiment, the value of a is 0.95.

In this embodiment, feasibility of the solution is improved by limiting a value of $\partial$.

According to a third aspect, an embodiment may provide a method for implementing model update.

In a federated learning process, a client receives a first model sent by a service device, and the client performs training based on the first model to obtain a second model.

The client sends difference information of a second model relative to the first model to the service device.

The client receives a third model and first training information that are sent by the service device. The third model is obtained by the service device by updating the first model based on the difference information sent by the client and difference information sent by another client, and the first training information is obtained by the service device based on the difference information sent by the client and the difference information sent by the another client.

The client trains the third model based on the first training information.

In this embodiment, the client receives the first training information sent by the service device, and the first training information is obtained through calculation based on the difference information of the client. Therefore, when the client trains the third model based on the first training information, accuracy of model training is improved.

In a first implementation of the third aspect of this embodiment, the first training information includes at least one of a first quantity of training batches or a first learning rate, the first quantity of training batches is used by the client to determine a quantity of training batches, and the first learning rate is used by the client to determine a training learning rate.

In this embodiment, the first training information may include a quantity of training batches and a learning rate to improve feasibility of the solution.

In a second implementation of the third aspect of this embodiment, when the client is a site analysis device, the site analysis device trains the third model based on the first training information and a first training sample, to obtain a fourth model. The first training sample includes feature data of a network device of a site network corresponding to the site analysis device.

In this embodiment, when the client is a site analysis device, the site analysis device may train the third model based on the feature data obtained by the network device in the site network to improve feasibility of the solution.

According to a fourth aspect, an embodiment may provide a service device, including a receiving unit, a calculation unit, an update unit and a sending unit.

The receiving unit is configured to receive difference information uploaded by at least two clients, where the difference information uploaded by the client is difference information that is of a second model relative to a first model and obtained by the client through training based on the first model, the first model is received by the client from the service device, and the second model is obtained by the client through training based on the first model.

The calculation unit is configured to perform calculation based on the difference information uploaded by the at least two clients, to obtain first difference consistency information, where the first difference consistency information indicates a consistency degree of the difference information uploaded by the at least two clients.

The update unit is configured to update the first model based on the difference information uploaded by the at least two clients, to obtain a third model.

The calculation unit is further configured to perform calculation based on the first difference consistency information, to obtain first training information, where the first training information is used to train the third model.

The sending unit is configured to send the first training information and the third model to the at least two clients.

Optionally, the calculation unit is configured to obtain the first difference consistency information through calculation according to the following formula:

$$GCR_t = \frac{\left|\sum_i g_i\right|}{\sum_i |g_i|}.$$

$GCR_t$ indicates the first difference consistency information, $g_i$ indicates difference information uploaded by an $i^{th}$ client in the at least two clients, and i is a positive integer greater than or equal to 1.

Optionally, the first training information includes at least one of a first quantity of training batches or a first learning rate, the first quantity of training batches is used by the client to determine a quantity of training batches, and the first learning rate is used by the client to determine a training learning rate.

Optionally, if the first training information includes the first quantity of training batches, the first training information obtained by the calculation unit through calculation based on the first difference consistency information meets the following condition:

if $GCR_t < GCR_{t-1}, E_t < E_{t-1}$;

if $GCR_t = GCR_{t-1}, E_t = E_{t-1}$; or if $GCR_t > GCR_{t-1}, E_t > E_{t-1}$.

$GCR_{t-1}$ indicates second difference consistency information, the second difference consistency information is difference consistency information obtained by the service device through calculation before the service device obtains the first difference consistency information, $GCR_t$ indicates the first difference consistency information, $E_{t-1}$ indicates a second quantity of training batches, the second quantity of training batches indicates a quantity of training batches delivered by the service device to the client before the service device obtains the first quantity of training batches, and $E_t$ indicates the first quantity of training batches.

Optionally, if the first training information includes the first learning rate, the first training information obtained by the calculation unit through calculation based on the first difference consistency information meets the following condition:

if $GCR_t < GCR_{t-1}, lr_t < lr_{t-1}$;

if $GCR_t = GCR_{t-1}, lr_t = lr_{t-1}$; or if $GCR_t > GCR_{t-1}, lr_t > lr_{t-1}$.

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates a second learning rate, the second learning rate is a learning rate delivered by the service device to the client before the service device obtains the first learning rate, and $lr_t$ indicates the first learning rate.

Optionally, the calculation unit is configured to perform calculation based on the first difference consistency information and first performance determining information, to obtain the first training information. The first performance determining information indicates a weight of a performance determining factor used when the service device calculates the first training information.

Optionally, the first performance determining information includes at least one of an accuracy weight and a communication cost weight, the accuracy weight indicates a weight of model accuracy set when the service device calculates the first training information, and the communication cost weight indicates a weight of a communication resource used when the service device calculates the first training information.

Optionally, if the first training information includes the first training batch information, and the first determining performance information includes the accuracy weight and the communication cost weight, the calculation unit calculates the first quantity of training batches according to the following formula:

$$E_t = \begin{cases} \alpha \times \dfrac{E_{t-1} + a}{b} + \beta \times E_{t-1} & GCR_t < GCR_{t-1} \\ E_{t-1} & GCR_t = GCR_{t-1} \\ c\alpha \times E_{t-1} + d\beta \times E_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $E_{t-1}$ indicates the second quantity of training batches, the second quantity of training batches indicates a quantity of training batches sent by the service device to the client last time, $E_t$ indicates the first training batch information, $\alpha$ indicates the accuracy weight, $\beta$ indicates the communication cost weight, and a, b, c, and d are positive numbers not greater than 6.

If $E_t$ obtained through calculation according to the formula is a non-positive integer, a value of $E_t$ is rounded to a positive integer.

Optionally, if the first training information includes the first learning rate, the calculation unit obtains the first learning rate through calculation according to the following formula:

$$lr_t = \begin{cases} a_1\alpha \times lr_{t-1} + \beta \times lr_{t-1} & GCR_t < GCR_{t-1} \\ lr_{t-1} & GCR_t = GCR_{t-1} \\ b_1\alpha \times lr_{t-1} + b_2\beta \times lr_{t-1} & GCR_t > GCR_{t-1} \end{cases}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates the second learning rate, the second learning rate is a learning rate delivered by the service device to the client before the service device obtains the first learning rate, $lr_t$ indicates the first learning rate, $\alpha$ indicates the accuracy weight, $\beta$ indicates the communication cost weight, and $a_1$, $b_1$, and $b_2$ are positive numbers not greater than 6.

Optionally, the service device further includes:

a correction unit, configured to correct the first difference consistency information by using an exponential moving average method, to obtain corrected first difference consistency information.

Optionally, the calculation unit is configured to correct the first difference consistency information by using an exponential movement parameter according to the following formula:

$$GCR'=GCR_{t-1}*\Theta+GCR_t*(1-\Theta).$$

$GCR_{t-1}$ indicates the second difference consistency information, the second difference consistency information is difference consistency information obtained by the service device through calculation before the service device obtains the first difference consistency information, $GCR_t$ indicates the first difference consistency information, and GCR' indicates the corrected first difference consistency information.

A value of $\Theta$ ranges from 0.9 to 0.99.

Optionally, the value of $\Theta$ is 0.95.

According to a fifth aspect, an embodiment provides a service device, including a receiving unit, an update unit, a processing unit, a calculation unit and a sending unit.

The receiving unit is configured to receive difference information uploaded by at least two clients, where the difference information uploaded by the client is difference information that is of a second model relative to a first model and obtained through training based on the first model, and the first model is received by the client from the service device.

The update unit is configured to update the first model based on the difference information uploaded by the at least two clients, to obtain a third model.

The processing unit is configured to obtain difference information (referred to as difference information of the service device) between the first model and the third model based on the first model and the third model.

The calculation unit is configured to perform calculation based on the difference information of the serve device and difference information of a first client of the at least two clients, to obtain target difference consistency information, where the target difference consistency information indicates a consistency degree between the difference information of the service device and the difference information of the first client.

The calculation unit is further configured to perform calculation based on the target difference consistency information, to obtain target training information, where the target training information is used to train the third model.

The sending unit is configured to send the target training information and the third model to the first client.

According to a sixth aspect, an embodiment provides a client, including a training unit, a sending unit and a receiving unit.

The training unit is configured to perform training based on a first model to obtain a second model, where the first model is received from a service device.

The sending unit is configured to send difference information of the second model relative to the first model to the service device.

The receiving unit is configured to receive a third model and first training information that are sent by the service device, where the third model is obtained by the service device by updating the first model based on difference information sent by the client and difference information sent by another client, and the first training information is obtained by the service device based on the difference information sent by the client and the difference information sent by the another client.

The training unit is further configured to train the third model based on the first training information.

Optionally, the first training information includes at least one of a first quantity of training batches or a first learning rate, the first quantity of training batches is used by the client to determine a quantity of training batches, and the first learning rate is used by the client to determine a training learning rate.

Optionally, the client is a site analysis device.

The training unit is further configured to train the third model based on the first training information and a first training sample, to obtain a fourth model. The first training sample includes feature data of a network device of a site network corresponding to the site analysis device.

According to a seventh aspect, an embodiment provides a terminal, including:

a processor, a memory, and an input/output device.

The processor is connected to the memory and the input/output device.

The processor performs the method according to the implementations of the first aspect and the third aspect.

According to an eighth aspect, an embodiment provides a service device, including:

a processor, a memory, and an input/output device.

The processor is connected to the memory and the input/output device.

The processor performs the method according to the implementations of the second aspect.

According to a ninth aspect, an embodiment provides a computer storage medium, where the computer storage medium stores instructions, and when the instructions are executed on a computer, the computer is enabled to perform the method according to the implementations of the first aspect to the third aspect.

According to a tenth aspect, an embodiment provides a computer program product. When the computer program product runs on a computer, the computer is enabled to perform the method according to the implementations of the first aspect to the third aspect.

It can be understood from the foregoing solutions that the embodiments may have the following advantage:

The service device obtains the first training information based on the difference information uploaded by the at least two clients and delivers the first training information to the client. In this process, the service device calculates the related first training information based on the difference information uploaded by the at least two clients. Because the difference information is related to a previous training result of the client, accuracy of model training performed by the client based on the first training information can be improved.

BRIEF DESCRIPTION OF THE DRAWINGS

FIG. 2 is a schematic flowchart of a model data processing method according to an embodiment;

DETAILED DESCRIPTION OF THE EMBODIMENTS

An embodiment provides a data processing method, so that when a training model is updated, first training information may be obtained based on difference information uploaded by a service device, and the first training information is delivered to a client. When the client performs training based on the first training information, accuracy of the model can be improved.

For ease of understanding of a reader, the embodiments briefly describe a learning algorithm in a provided model update method.

FL is an emerging artificial intelligence basic technology and is originally used to resolve a problem in updating a model locally by an end user of an Android phone. Federated learning is designed to implement efficient machine learning between a plurality of participants or a plurality of computing nodes while protecting privacy of terminal data and personal data and ensuring legal compliance. Currently, the purpose of federated learning is to jointly build an AI model without sharing data, to improve an effect of the AI model.

As an important branch of the AI field, a machine learning algorithm is widely used in many fields. From a perspective of a learning method, the machine learning algorithm may fall into the following types: a supervised learning algorithm, an unsupervised learning algorithm, a semi-supervised learning algorithm, and a reinforcement learning algorithm. The supervised learning algorithm means that an algorithm may be learned or a pattern may be established based on training data, to infer a new instance based on the algorithm or the pattern. The training data, also referred to as a training sample, includes input data and an expected output. A model of the machine learning algorithm is also referred to as a machine learning model, and an expected output of the model is referred to as a label that may be a predicted classification result (referred to as a classification label). A difference between the unsupervised learning algorithm and the supervised learning algorithm lies in that a training sample of the unsupervised learning algorithm has no given label, and the model of the machine learning algorithm obtains a specified result by analyzing the training sample. For the semi-supervised learning algorithm, some training samples thereof have labels and some other training samples have no label, and an amount of data having no label is far greater than an amount of data having a label. With constant attempts in an environment, the reinforcement learning algorithm obtains a maximum expected benefit, and generates, by using a reward or a penalty given in the environment, a choice for obtaining a maximum benefit.

Figure 1:
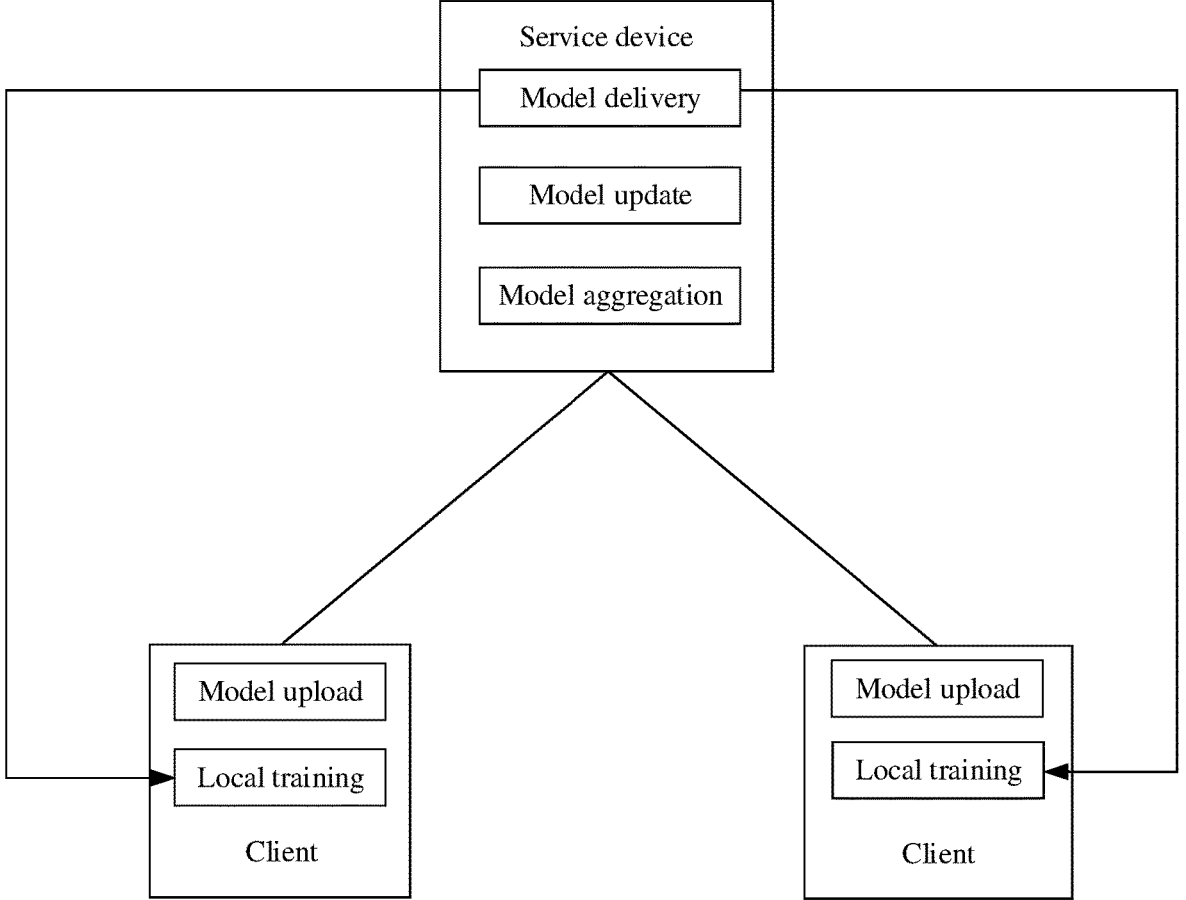
FIG. 1 is a framework diagram of federated training according to an embodiment.

FIG. 1 is a schematic diagram of a framework of a method for implementing model update.

As shown in FIG. 1, the framework of the model update method includes a plurality of devices, and the plurality of devices include a service device and a client. A quantity of service devices and a quantity of clients in FIG. 1 are merely used as an example and are not intended to limit an application scenario of the model update method provided in this embodiment.

The service device may be any device that supports multi-model aggregation and combination, or a cloud platform, a server, a public cloud, or the like. This is not limited herein. The client may be any device that supports local training, for example, a mobile phone, a tablet, a computer, a switch, an optical line terminal (OLT), an optical network device (ONT), or a router. This is not limited herein.

The service device and the client may be connected through a wired network or a wireless network. If the service device and the client are connected through a wired network, a general connection form is a fiber optic network. It may be understood that the service device and the client may alternatively be connected through another wired network. This is not limited herein. If the service device and the client are connected through a wireless network, the service device and the client may be connected through Bluetooth or wireless network Wi-Fi. It may be understood that the service device and the client may alternatively be connected through another wireless network. This is not limited herein.

In the framework of the model update method, the service device delivers a model to the client. After receiving the model, the client performs training locally. After the training is completed, the client sends a trained model to the service device or sends difference information to the service device. After receiving the model or the difference information sent by the client, the service device updates a central model.

After updating the central model, the service device delivers an updated central model to the client for next training.

In an actual application process, a learning rate may also be referred to as a stride. In other words, the learning rate in this embodiment may be replaced with a stride. This is not limited herein.

It may be understood that in the framework of the model update method, an application scenario is not limited, provided that the framework can be applied to an application scenario.

The following describes the model update method in an embodiment of this application with reference to the framework of the model update method in FIG. 1.

In this embodiment, the model update method may be applied to a plurality of application scenarios. Therefore, in this embodiment, implementations of several scenarios are exemplarily listed, and the following separately describes the implementations.

FIG. 2 is a schematic flowchart of a model update method according to an embodiment.

Step 201: A service device receives difference information uploaded by at least two clients.

During federated training, when the client completes training, the client sends difference information to the service device. The service device may receive at least two pieces of difference information sent by at least two clients. The difference information is difference information between a first model and a second model, the first model is sent by the service device to the client, and the second model is obtained by the client through training based on the first model. For example, the client performs incremental training on the first model, to obtain the second model. In the actual application process, the difference information may be gradient information, or may be information of another type, provided that the difference information can represent difference information between a model before training and a model after training of the client. This is not limited herein.

For example, the differential information may be a matrix including differences of a plurality of parameters. For example, the first model includes four parameters, and a matrix formed by values of the four parameters is [a1, b1, c1, d1]. The second model also includes the four parameters, and a matrix formed by values of the four parameters is [a2, b2, c2, d2]. In this case, a matrix formed by differences of the four parameters is [a2-a1, b2-b1, c2-c1, d2-d1]. That is, the difference information is [a2-a1, b2-b1, c2-c1, d2-d1].

Step 202: The service device performs calculation based on the at least two pieces of difference information, to obtain first difference consistency information.

When the service device receives the difference information uploaded by the at least two clients, the service device performs calculation based on the at least two pieces of difference information, to obtain the first difference consistency information. The first difference consistency information indicates a consistency degree of the difference information of the at least two clients.

In the actual application process, when the difference information is gradient information, the first difference consistency information is gradient consistency information. The first difference consistency information may be obtained through calculation according to the following formula:

$$GCR_t = \frac{\left| \sum_i g_i \right|}{\sum_i |g_i|}.$$

$GCR_t$ indicates the first difference consistency information, and $g_i$ indicates difference information from an $i^{th}$ client. For example, when the difference information of the two clients is received, the formula is:

$$GCR_t = \frac{|g_1 + g_2|}{|g_1| + |g_2|}.$$

It may be understood that the first difference consistency information may be calculated according to another variant formula. This is not limited herein.

Step 203: The service device corrects the first difference consistency information by using an exponential movement method, to obtain corrected first difference consistency information.

After the service device performs calculation based on the difference information, to obtain the first difference consistency information, the service device may correct the first difference consistency information by using the exponential moving average method, to obtain the corrected first difference consistency information.

In the actual application process, the correction process may be understood as a process in which the service device performs exponential moving average (EMA) smoothing on the first difference consistency information. The service device corrects the first difference consistency information in an EMA smoothing manner, to obtain the corrected first difference consistency information. For example, the corrected first difference consistency information may be obtained according to the following formula:

$$GCR' = GCR_{t-1} * \vartheta + GCR_t * (1 - \vartheta).$$

$GCR_{t-1}$ indicates second difference consistency information, the second difference consistency information is difference consistency information obtained by the service device through calculation before the service device obtains the first difference consistency information, GCR' indicates the corrected first difference consistency information, and α indicates an exponential moving parameter.

It should be noted that a value of a may range from 0.9 to 0.99, and further, may be 0.95. This is not limited herein.

It may be understood that in the actual application process, the first difference consistency information may be obtained through calculation according to another variant formula. This is not limited herein.

Step 204: The service device obtains first training information based on the corrected first difference consistency information and first performance determining information.

After the service device obtains the corrected first difference consistency information, the service device performs calculation based on the corrected first difference consistency information and the first performance determining information generated by the service device, to obtain the first training information.

The first performance determining information is preset by the service device and indicates a weight of a performance determining factor for calculating next training information.

Optionally, the first performance determining information may include an accuracy weight and a communication cost weight.

Correspondingly, a larger value of the accuracy weight indicates higher accuracy during subsequent model training.

Correspondingly, a larger value of the communication cost weight indicates a lower frequency of upload during subsequent model training, that is, fewer communication resources used for transmission between the client and the service device.

In this embodiment, $\alpha$ and $\beta$ indicates the accuracy weight and the communication cost weight respectively. It may be understood that in the actual application process, other symbols may indicate the accuracy weight and the communication cost weight. This is not limited herein.

For example, corresponding values of $\alpha$ and $\beta$ may be set according to the following formula: $\alpha+\beta=1$.

Further, performance of federated learning may be evaluated according to the following formula:

$$P = \alpha \times \frac{Acc}{Acc_{max}} + \beta \times \frac{Cost_{max} - Cost}{Cost_{max}}.$$

Acc indicates model accuracy, $Acc_{max}$ indicates a maximum value of the model accuracy, Cost indicates a value of a communication cost actually consumed in a federated learning process, that is, a value of a consumed communication resource, and $Cost_{max}$ indicates a maximum value of the communication cost, that is, indicates that a value of a communication cost of federated learning is a maximum value each time the client trains a model and upload the model to the service device, where P indicates performance of the federated learning process. A larger value of P may indicate better federated learning performance. $\alpha+\beta=1$. When $\alpha$ is larger and $\beta$ is smaller, it indicates that the improvement of the model accuracy is more considered during model training, and the value of the consumed communication resource is larger in this case. When $\alpha$ is smaller and $\beta$ is larger, it indicates that the value of the communication cost is more considered during model training. That is, the value of the consumed communication resource is smaller in this case.

For example, when $\alpha=0.5$, and $\beta=0.5$, it indicates that the model accuracy weight is the same as the communication cost weight. When $\alpha=0.75$, and $\beta=0.25$, it indicates that the model accuracy weight is higher, and the communication cost weight is lower. When $\alpha=0.25$, and $\beta=0.75$, it indicates that the model accuracy weight is lower, and the communication cost weight is higher.

Further, an effect of federated learning may be further evaluated according to this formula.

For example, a larger value of P indicates a better federated learning effect, and a smaller value of P indicates a poorer federated learning effect.

When the first training information includes first quantity of training batches, the service device may obtain the first training batch information through calculation according to the following formula:

$$E_t = \begin{cases} \alpha \times \dfrac{E_{t-1} + a}{b} + \beta \times E_{t-1} & GCR_t < GCR_{t-1} \\ E_{t-1} & GCR_t = GCR_{t-1}. \\ c\alpha \times E_{t-1} + d\beta \times E_{t-1} & GCR_t > GCR_{t-1} \end{cases}$$

$GCR_{t-1}$ indicates the second difference consistency information, and the second difference consistency information is difference consistency information obtained by the service device through calculation before the service device obtains the first difference consistency information. That is, when the service device receives the difference information uploaded by the at least two clients last time, the second difference information is obtained by the service device through calculation based on the difference information uploaded by the at least two clients last time. $GCR_t$ indicates the first difference consistency information, and $E_{t-1}$ indicates a second quantity of training batches, namely, a quantity of training batches delivered by the service device to the client before the first training batch information. $E_t$ indicates the first quantity of training batches, that is, indicates a quantity of training batches this time. $\alpha$ indicates the accuracy weight, $\beta$ indicates the communication cost weight, and a, b, c, and d are positive integers not greater than 6. For example, a value of a is 3, a value of b is 4, a value of c is 2, and a value of d is 4.

When a value of $E_t$ obtained by the service device through calculation is a non-positive integer, the value of $E_t$ is rounded to a positive integer.

For example, when the value of $E_t$ obtained by the service device through calculation is 3.3, the value of $E_t$ is rounded down to 3, or the value of $E_t$ is rounded up to 4. A rounding manner is not limited herein.

It may be understood that, in the actual application process, the first training batch information may alternatively be obtained according to another formula, provided that the first training batch information meets the following condition:

if $GCR_t < GCR_{t-1}, E_t < E_{t-1}$, where $E_t$ is $a$ positive integer;

if $GCR_t = GCR_{t-1}, E_t = E_{t-1}$, where $E_t$ is $a$ positive integer; or if $GCR_t > GCR_{t-1}, E_t > E_{t-1}$, where $E_t$ is $a$ positive integer.

When the first training information includes a first learning rate, the service device may obtain the first learning rate through calculation according to the following formula:

$$lr_t = \begin{cases} a_1\alpha \times lr_{t-1} + \beta \times lr_{t-1} & GCR_t < GCR_{t-1} \\ lr_{t-1} & GCR_t = GCR_{t-1}. \\ b_1\alpha \times lr_{t-1} + b_2\beta \times lr_{t-1} & GCR_t > GCR_{t-1} \end{cases}$$

$GCR_{t-1}$ indicates the second difference consistency information, and the second difference consistency information is difference consistency information obtained by the service device through calculation before the service device obtains the first difference consistency information. That is, when the service device receives the difference information uploaded by the at least two clients last time, the second difference information is obtained by the service device through calculation based on the difference information uploaded by the at least two clients last time. $GCR_t$ indicates the first difference consistency information, $lr_{t-1}$ indicates a second learning rate, the second learning rate is a learning rate delivered by the service device to the client before the first learning rate, and $lr_t$ indicates the first learning rate, that is, indicates a learning rate that is to be delivered by the service device to the client this time. $\alpha_\alpha$ indicates second performance determining information, $\beta$ indicates third performance determining information, and $a_1$, $b_1$, and $b_2$ are positive integers not greater than 6. For example, $a_1=0.1$, $b_1=2$, and $b_2=4$.

It may be understood that, in the actual application process, the first learning rate may alternatively be obtained according to another formula, provided that a calculation result of the formula meets the following condition:

if $GCR_t < GCR_{t-1}, lr_t < lr_{t-1}$;

if $GCR_t = GCR_{t-1}, lr_t = lr_{t-1}$; or if $GCR_t > GCR_{t-1}, lr_t > lr_{t-1}$.

Step 205: The service device updates a central model.

The service device updates the central model of the service device based on the difference information received from the client, to obtain an updated model.

The central model is a first model, and the updated central model is a third model.

When N clients are connected to the service device, the service device may count a quantity L of clients that send difference information to the service device, where L is less than or equal to N. When a ratio of L to N is greater than a threshold K, and K is greater than 0 and less than or equal to 1, and may be a value greater than 0.5, for example, 0.8, the service device updates the first model by using a plurality of pieces of received difference information, to obtain a third model, and delivers the third model to each of the N clients.

For example, the service device may update the central model based on the difference information to obtain the updated model in the following manner:

obtaining an average value of the difference information uploaded by the at least two clients and updating the first model by using the average value, to obtain the third model. For example, the first model is updated based on difference information uploaded by a client 1 and a client 2. The difference information uploaded by the client 1 and the client 2 is respectively [a2−a1, b2−b1, c2−c1, d2−d1] and [a3−a1, b3−b1, c3−c1, d3−d1], and an average value of the difference information uploaded by the two clients is [(a2−a1+a3−a1)/2, (b2−b1+b3−b1)/2, (c2−c1+c3−c1)/2, (d2−d1+d3−d1)/2]. The first model is updated by using the average value.

Step 206: The service device sends the first training information to the client.

After the service device updates the central model, the service device delivers the updated model to the client and sends the first training information to the client.

In the actual application process, after the client receives the updated model and the first training information, the client updates a local model based on the updated model delivered by the service device, updates a local quantity of training batches and learning rate, and then performs training, that is, performs, based on received training information (such as a quantity of training batches and learning rate), further model training on the updated model delivered by the service device. After the training ends, difference information is sent to the service device again, and steps 201 to 206 are repeated until the central model converges and federated learning training ends.

In this embodiment, in step 204, the first performance determining information may not be set. In this case, when the first training information is obtained through calculation, the first performance determining information is not substituted into the formula as a parameter.

In this embodiment, step 203 is an optional step. When step 203 is not performed, the service device may directly perform calculation based on the first difference consistency information obtained through calculation in step 202, to obtain the first training information.

It should be noted that in this embodiment, there is no sequence between step 205 and step 202 to step 204.

In this embodiment, the service device obtains the first training information by using the difference information uploaded by the at least two clients and delivers the first training information to the client. In this process, the service device calculates, based on the difference information uploaded by the client, the first training information required for next model training of the client. Because the difference information is related to a previous training result of the client, the model accuracy can be improved when the client performs training by using the first training information.

Figure 3:
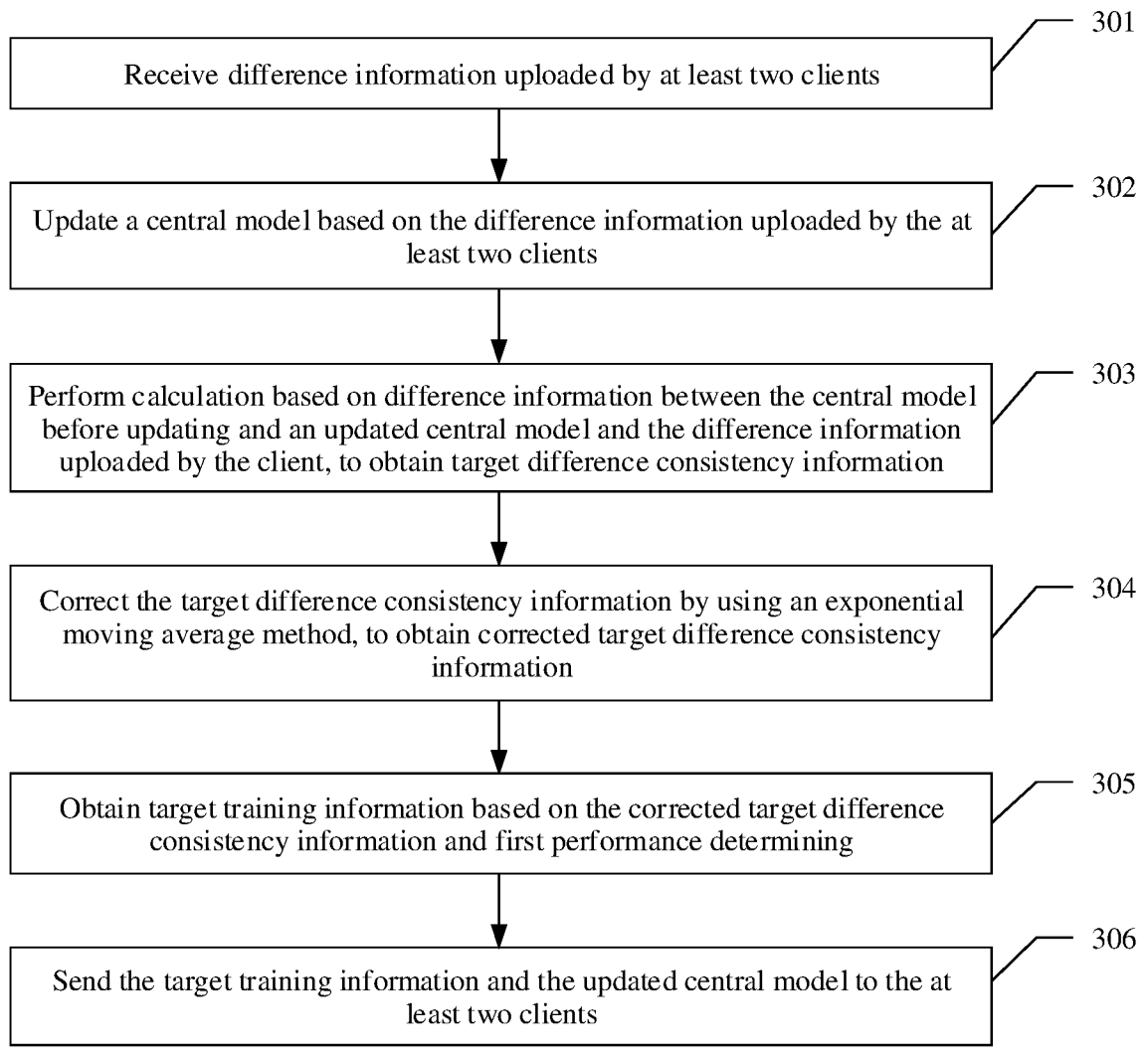
FIG. 3 is another schematic flowchart of a model data processing method according to an embodiment.

FIG. 3 is a schematic flowchart of a model update method according to another embodiment.

Step 301: A service device receives difference information uploaded by at least two clients.

Step 302: The service device updates a central model based on the difference information uploaded by the at least two clients.

Step 301 and step 302 in this embodiment are similar to step 201 and step 205 in the embodiment corresponding to FIG. 2 and are not described herein again.

Step 303: The service device performs calculation based on difference information between the central model before updating and an updated central model and the difference information uploaded by the client, to obtain target difference consistency information.

When the service device receives the difference information uploaded by the at least two clients, if the service device needs to calculate target training information of one of the clients, the service device first updates the central model based on the difference information uploaded by the at least two clients, and then obtains the difference information between the central model before updating and the updated central model. The service device performs calculation based on the difference information uploaded by the client and the difference information between the central model of the service device before updating and the updated central model of the service device, to obtain the target difference consistency information. The target difference consistency information indicates a consistency degree between the difference information uploaded by the client and the difference information between the central model of the service device before updating and the updated central model of the service device.

The central model is a first model, and the updated central model is a second model.

In the actual application process, when the difference information is gradient information, the target difference consistency information is gradient consistency information. The target difference consistency information may be obtained through calculation according to the following formula:

$$GCR_t = \frac{|g_3 + g_4|}{|g_3| + |g_4|}.$$

$GCR_t$ indicates the target difference consistency information, $g_3$ indicates the difference information from the client, and $g_4$ indicates the difference information between the central model of the service device before updating and the updated central model of the service device.

It may be understood that there may be the target difference consistency information may be calculated according to another variant formula. This is not limited herein.

Step 304: The service device corrects the target difference consistency information by using an exponential moving average method, to obtain corrected target difference consistency information.

Step 305: The service device obtains target training information based on the corrected target difference consistency information and first performance determining information.

Step 306: The service device sends the target training information and the updated central model to the at least two clients.

Step 304 to step 306 in this embodiment are similar to step 203, step 204, and step 206 in the embodiment shown in FIG. 2 and are not described herein again.

In this embodiment, the service device may determine target training information for each client in the at least two clients. For any one of the clients, target difference consistency information corresponding to the client is obtained in step 303, and, the target difference consistency information is obtained based on difference information of the client. For a manner of correcting the target difference consistency information in step 304, refer to the manner of correcting the first difference consistency information in step 203. During correction, difference consistency information corresponding to the client obtained in a previous round of calculation may be used as the second difference consistency information in step 203 to correct the target difference consistency information. For a manner of obtaining the target training information in step 305, refer to the manner of obtaining the first training information in step 204. Correspondingly, in step 306, the target training information corresponding to the client is sent to the client.

In the actual application process, after the client receives the updated model and the target training information, the client updates a local model based on the updated model delivered by the service device, updates a local quantity of training batches and learning rate, and then performs training. After the training ends, difference information is sent to the service device again, and steps 301 to 306 are repeated until the central model converges and federated learning training ends.

In this embodiment, in step 305, the first performance determining information may not be set. In this case, when the target training information is obtained through calculation, the first performance determining information is not substituted into the formula as a parameter.

In this embodiment, step 304 is an optional step. When step 304 is not performed, the service device may directly perform calculation based on the target difference consistency information obtained in step 303, to obtain the target training information.

In this embodiment, the service device calculates target training information of a single client by using difference information of the single client and delivers the target training information to the client. When the client trains a model by using the target training information, accuracy of training the model by the single client based on the target training information is improved compared with using target training information obtained through unified calculation. During an implementation, for each client in the plurality of clients, the service device may perform the foregoing steps to calculate target training information of the client and send target training information to the client.

Figure 4:
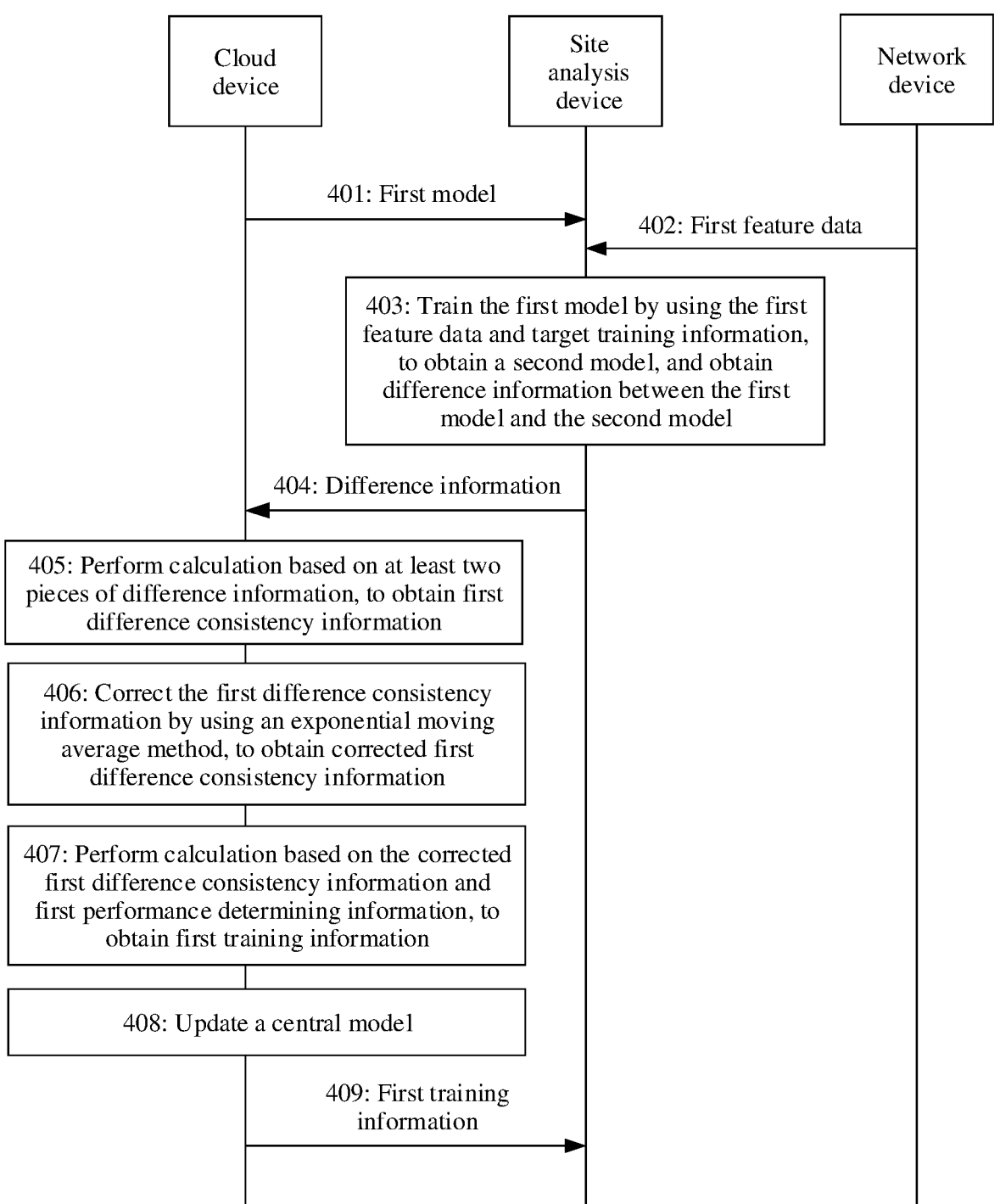
FIG. 4 is still another schematic flowchart of a model data processing method according to an embodiment.

FIG. 4 is a schematic flowchart of a model update method according to still another embodiment.

In this embodiment, an example in which a service device is a cloud device and a client is a site analysis device is used for description.

In this application scenario, a model data processing system related to the model data processing method includes a plurality of site analysis devices, that is, includes a plurality of site networks. The site network may be a core network or an edge network. A user in each site network may be a carrier or an enterprise customer. Different site networks may be different networks divided based on corresponding dimensions, for example, may be networks in different regions, networks of different carriers, different service networks, and different network domains. The plurality of site analysis devices may be in a one-to-one correspondence with the plurality of site networks. Each site analysis device is configured to provide a data analysis service for a corresponding site network, and the site analysis device may be located in the corresponding site network or may be located outside the corresponding site network.

Step 401: The cloud device sends a first model to the site analysis device.

In a model training process, the cloud device obtains the first model, and sends the first model to the site analysis device.

It should be noted that the cloud device may further send target training information to the site analysis device. The target training information indicates parameter information used when the site analysis device trains the first model.

Step 402: A network device sends first feature data to the site analysis device.

The network device sends the first feature data to the site analysis device, where the first feature data is data generated by the network device.

The first feature data may include data such as image data, sound data, KPI data, and the like. For example, when the network device is a camera, feature data of the camera may be image data collected and generated by the camera. For example, when the network device is a voice recorder, feature data of the voice recorder may be sound data collected and generated by the voice recorder. For example, when the network device is a switch, feature data of the switch may be KPI data, and the KPI data may be statistical information generated when the switch forwards traffic, for example, a quantity of outgoing packet bytes, a quantity of outgoing packets, a queue depth, throughput information, and a quantity of lost packets.

Step 403: The site analysis device trains the first model by using the first feature data and the target training information, to obtain a second model, and obtains difference information between the first model and the second model.

After the site analysis device receives the first feature data, the site analysis device trains the first model by using the first feature data and the target training information, to obtain the second model. The site analysis device then compares the first model with the second model, to obtain the difference information between the first model and the second model.

For example, the differential information may be a matrix including differences of a plurality of parameters. For example, the first model includes four parameters, and a matrix formed by values of the four parameters is [a1, b1, c1, d1]. The second model also includes the four parameters, and a matrix formed by values of the four parameters is [a2, b2, c2, d2]. In this case, a matrix formed by differences of the four parameters is [a2−a1, b2−b1, c2−c1, d2−d1]. That is, the difference information is [a2−a1, b2−b1, c2−c1, d2−d1].

Step 404: The site analysis device sends the difference information to the cloud device.

After the site analysis device obtains the difference information, the site analysis device sends the difference information to the cloud device.

Step 405: The cloud device performs calculation based on at least two pieces of difference information, to obtain first difference consistency information.

When the cloud device receives the at least two pieces of difference information uploaded by at least two site analysis devices, the cloud device performs calculation based on the difference information, to obtain the first difference consistency information. The first difference consistency information indicates a consistency degree of difference information of the two site analysis devices.

In an actual application process, when the difference information is gradient information, the first difference consistency information is gradient consistency information. The first difference consistency information may be obtained through calculation according to the following formula:

$$GCR_t = \frac{\left|\sum_i g_i\right|}{\sum_i |g_i|}.$$

$GCR_t$ indicates the first difference consistency information, and $g_i$ indicates difference information from an $i^{th}$ site analysis device. For example, when the difference information of the two site analysis devices is received, the formula is:

$$GCR_t = \frac{|g_1 + g_2|}{|g_1| + |g_2|}.$$

It may be understood that the first difference consistency information may be calculated according to another variant formula. This is not limited herein.

Step 406: The cloud device corrects the first difference consistency information by using an exponential moving average method, to obtain corrected first difference consistency information.

After the cloud device performs calculation based on the difference information, to obtain the first difference consistency information, the cloud device may correct the first difference consistency information by using the exponential moving average method, to obtain the corrected first difference consistency information.

In the actual application process, the correction process may be understood as a process in which the cloud device performs exponential moving average EMA smoothing on the first difference consistency information. The cloud device may correct the first difference consistency information in an EMA smoothing manner to obtain the corrected first difference consistency information. For example, the corrected first difference consistency information may be obtained according to the following formula:

$$GCR' = GCR_{t-1} * \partial + GCR_t * (1 - \partial).$$

$GCR_{t-1}$ indicates second difference consistency information, the second difference consistency information is difference consistency information obtained by the cloud device through calculation before the cloud device obtains the first difference consistency information, $GCR'$ indicates the corrected first difference consistency information, and $\alpha$ indicates an exponential moving parameter.

It should be noted that a value of $\partial$ may range from 0.9 to 0.99, and further, may be 0.95. This is not limited herein.

It may be understood that in the actual application process, the first difference consistency information may be obtained through calculation according to another variant formula. This is not limited herein.

Step 407: The cloud device performs calculation based on the corrected first difference consistency information and first performance determining information, to obtain first training information.

After the cloud device obtains the corrected first difference consistency information, the cloud device performs calculation based on the corrected first difference consistency information and the first performance determining information generated by the cloud device, to obtain the first training information.

The first performance determining information is preset by the cloud device and indicates a weight of each parameter for calculating next training information.

Optionally, the first performance determining information may include an accuracy weight and a communication cost weight.

Correspondingly, a larger value of the accuracy weight indicates higher accuracy during subsequent model training.

Correspondingly, a larger value of the communication cost weight indicates a lower frequency of upload during subsequent model training, that is, fewer communication resources used for transmission between the client and the service device.

In this embodiment, $\alpha$ and $\beta$ indicate the accuracy weight and the communication cost weight respectively. It may be understood that in the actual application process, other symbols may indicate the accuracy weight and the communication cost weight. This is not limited herein.

For example, performance of federated learning may be evaluated according to the following formula:

$$P = \alpha \times \frac{Acc}{Acc_{max}} + \beta \times \frac{Cost_{max} - Cost}{Cost_{max}}.$$

Acc indicates model accuracy, $Acc_{max}$ indicates a maximum value of the model accuracy, Cost indicates a value of a communication cost actually consumed in a federated learning process, that is, a value of a consumed communication resource, and $Cost_{max}$ indicates a maximum value of the communication cost, that is, indicates that a value of a communication cost of federated learning is a maximum value each time the site analysis device trains a model and upload the model to the cloud device, where P indicates performance of the federated learning process. A larger value of P may indicate a better federated learning performance. $\alpha + \beta = 1$. When a is larger and $\beta$ is smaller, it indicates that the improvement of the model accuracy is more considered during model training, and the value of the consumed communication resource is larger in this case. When $\alpha$ is smaller and $\beta$ is larger, it indicates that the value of the communication cost is more considered during model training. That is, the value of the consumed communication resource is smaller in this case.

For example, when $\alpha = 0.5$, and $\beta = 0.5$, it indicates that the model accuracy weight is the same as the communication cost weight. When $\alpha = 0.75$, and $\beta = 0.25$, it indicates that the model accuracy weight is higher, and the communication cost weight is lower. When $\alpha = 0.25$, and $\beta = 0.75$, it indicates that the model accuracy weight is lower, and the communication cost weight is higher.

Further, an effect of federated learning may be further evaluated according to this formula.

For example, a larger value of P indicates a better federated learning effect, and a smaller value of P indicates a poorer federated learning effect.

When the first training information includes first training batch information, the cloud device may obtain the first training batch information through calculation according to the following formula:

$$
E_t = \begin{cases} \alpha \times \dfrac{E_{t-1}+a}{b} + \beta \times E_{t-1} & GCR_t < GCR_{t-1} \\ E_{t-1} & GCR_t = GCR_{t-1}. \\ c\alpha \times E_{t-1} + d\beta \times E_{t-1} & GCR_t > GCR_{t-1} \end{cases}
$$

$GCR_{t-1}$ indicates the second difference consistency information, and the second difference consistency information is difference consistency information obtained by the cloud device through calculation before the cloud device obtains the first difference consistency information. That is, when the cloud device receives the difference information uploaded by the at least two site analysis devices last time, the second difference information is obtained through calculation by the cloud device based on the difference information uploaded by the at least two site analysis devices last time. $GCR_t$ indicates the first difference consistency information, and $E_{t-1}$ indicates second training batch information, that is, training batch information delivered by the cloud device to the site analysis device before the first training batch information. $E_t$ indicates the first training batch information, that is, indicates a current training batch, $\alpha$ indicates the accuracy weight, $\beta$ indicates the communication cost weight, and a, b, c, and d are positive integers not greater than 6. For example, a value of a is 3, a value of b is 4, a value of c is 2, and a value of d is 4.

When a value of $E_t$ obtained by the cloud device through calculation is a non-positive integer, the value of $E_t$ is rounded to a positive integer.

For example, when the value of $E_t$ obtained by the cloud device through calculation is 3.3, the value of $E_t$ is rounded down to 3, or the value of $E_t$ is rounded up to 4. A rounding manner is not limited herein.

It may be understood that, in the actual application process, the first training batch information may alternatively be obtained according to another formula, provided that the first training batch information meets the following condition:

if $GCR_t < GCR_{t-1}, E_t < E_{t-1}$, where $E_t$ is a positive integer;

if $GCR_t = GCR_{t-1}, E_t = E_{t-1}$, where $E_t$ is a positive integer; or if $GCR_t > GCR_{t-1}, E_t > E_{t-1}$, where $E_t$ is a positive integer.

When the first training information includes a first learning rate, the cloud device may obtain the first learning rate through calculation according to the following formula:

$$
lr_t = \begin{cases} a_1\alpha \times lr_{t-1} + \beta \times lr_{t-1} & GCR_t < GCR_{t-1} \\ lr_{t-1} & GCR_t = GCR_{t-1}. \\ b_1\alpha \times lr_{t-1} + b_2\beta \times lr_{t-1} & GCR_t > GCR_{t-1} \end{cases}
$$

$GCR_{t-1}$ indicates the second difference consistency information, and the second difference consistency information is difference consistency information obtained by the cloud device through calculation before the cloud device obtains the first difference consistency information. That is, when the cloud device receives the difference information uploaded by the at least two site analysis devices last time, the second difference information is obtained by the service device through calculation based on the difference information uploaded by the at least two site analysis devices last time. $GCR_t$ indicates the first difference consistency information, $lr_{t-1}$ indicates a second learning rate, and the second learning rate is a learning rate delivered by the cloud device to the site analysis device before the first learning rate. $lr_t$ indicates the first learning rate, that is, indicates a learning rate that is to be delivered by the cloud device to the site analysis device this time. $\alpha_\alpha$ indicates second performance determining information, $\beta$ indicates third performance determining information, and $a_1$, $b_1$, and $b_2$ are positive integers not greater than 6. For example, $a_1=0.1$, $b_1=2$, and $b_2=4$.

It may be understood that, in the actual application process, the first learning rate may alternatively be obtained according to another formula, provided that a calculation result of the formula meets the following condition:

if $GCR_t < GCR_{t-1}, lr_t < lr_{t-1}$;

if $GCR_t = GCR_{t-1}, lr_t = lr_{t-1}$; or if $GCR_t > GCR_{t-1}, lr_t > lr_{t-1}$.

Step 408: The cloud device updates a central model.

The cloud device updates the central model of the cloud device based on the difference information received from the site analysis device, to obtain an updated model.

When N site analysis devices are connected to the cloud device, the cloud device may count a quantity L of site analysis devices that send difference information to the cloud device, where L is less than or equal to N. When a ratio of L to N is greater than a threshold K, and K is greater than 0 and less than or equal to 1, and may be a value greater than 0.5, for example, 0.8, the cloud device updates the first model by using a plurality of pieces of received difference information, to obtain a third model, and delivers the third model to each of the N site analysis devices.

For example, the cloud device may update the central model based on the difference information to obtain the updated model in the following manner:

obtaining an average value of the difference information uploaded by the at least two site analysis devices and updating the first model by using the average value, to obtain the third model. For example, the first model is updated based on difference information uploaded by a site analysis device 1 and a site analysis device 2. The difference information uploaded by the site analysis device 1 and the site analysis device 2 is respectively [a2–a1, b2–b1, c2–c1, d2–d1] and [a3–a1, b3–b1, c3–c1, d3–d1], and an average value of the difference information uploaded by the two site analysis devices is [(a2–a1+a3–a1)/2, (b2–b1+b3–b1)/2, (c2–c1+c3–c1)/2, (d2–d1+d3–d1)/2]. The first model is updated by using the average value.

Step 409: The cloud device sends the first training information to the site analysis device.

After the cloud device updates the central model, the cloud device delivers the updated model to the site analysis device and sends the first training information to the site analysis device.

In the actual application process, after the site analysis device receives the updated model and the first training information, the site analysis device updates a local model based on the updated model delivered by the cloud device, updates a local quantity of training batches and learning rate, and then performs training. After the training ends, the site analysis device sends difference information to the cloud device again, and steps 406 to 410 are repeated until the central model converges and model training ends.

In this embodiment, in step 407, the first performance determining information may not be set. In this case, when the first training information is obtained through calculation, the first performance determining information is not substituted into the formula as a parameter.

In this embodiment, step 406 is an optional step. When step 406 is not performed, the service device may directly perform calculation based on the first difference consistency information obtained through calculation in step 405, to obtain the first training information.

In this embodiment, the site analysis device obtains the first feature data sent by the network device and performs model training by using the first feature data, to improve feasibility of the solution.

There may be a plurality of implementations of sending the updated central model in the foregoing steps 206, 306, and 409.

Complete model data of the updated central model may be sent. The complete model data includes model structure data (for example, a function form of the model) and model parameter data (including a value of a model parameter) of the updated central model. Correspondingly, after receiving the complete model data, the client may directly load the complete model data to obtain the updated central model, and replace the central model (that is, the central model received in the previous round) in the client.

Only the model parameter data of the updated central model may be sent. Correspondingly, after receiving the model parameter data of the updated central model, the client may replace model parameter data of the central model in the client with the model parameter data, to obtain the updated central model.

Difference information between the model parameter data of the updated central model and the model parameter data of the central model before updating may be sent. Correspondingly, after receiving the difference information, the client modifies the model parameter data of the central model in the client by using the difference information, to obtain the updated central model. For example, if a value of a parameter of the central model in the client is a, and difference information corresponding to the model parameter is +b, the client changes an updated value of the model parameter to a+b.

Figure 5:
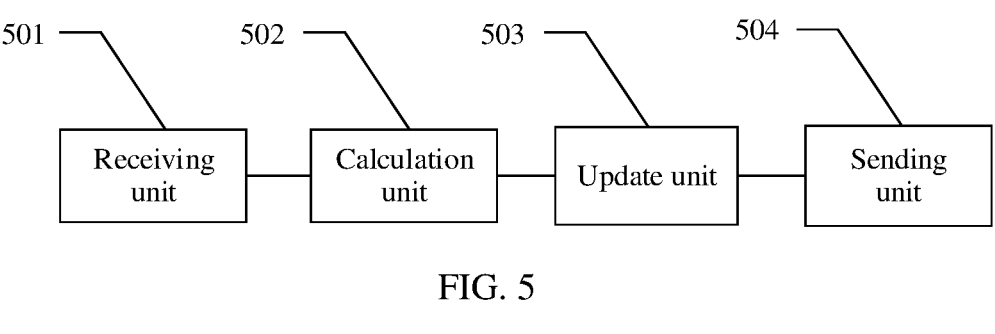
FIG. 5 is a schematic diagram of a structure of a service device according to an embodiment.

The foregoing describes the model data processing method in this embodiment and the following describes the service device in this embodiment. FIG. 5 is a schematic diagram of a structure of a service device according to an embodiment. The service device includes a receiving unit 501, a calculation unit 502, an update unit 503 and a sending unit 504.

The receiving unit 501 is configured to receive difference information uploaded by at least two clients, where the difference information uploaded by the client is difference information that is of a second model relative to a first model and obtained by the client through training based on the first model, the first model is received by the client from the service device, and the second model is obtained by the client through training based on the first model.

The calculation unit 502 is configured to perform calculation based on the difference information uploaded by the at least two clients, to obtain first difference consistency information, where the first difference consistency information indicates a consistency degree of the difference information uploaded by the at least two clients.

The update unit 503 is configured to update the first model based on the difference information uploaded by the at least two clients, to obtain a third model.

The calculation unit 502 is further configured to perform calculation based on the first difference consistency information, to obtain first training information, where the first training information is used to train the third model.

The sending unit 504 is configured to send the first training information and the third model to the at least two clients.

In this embodiment, operations performed by units of the service device are similar to those described in the method performed by the service device in the embodiment shown in FIG. 2 or FIG. 4 and are not described herein again.

Figure 6:
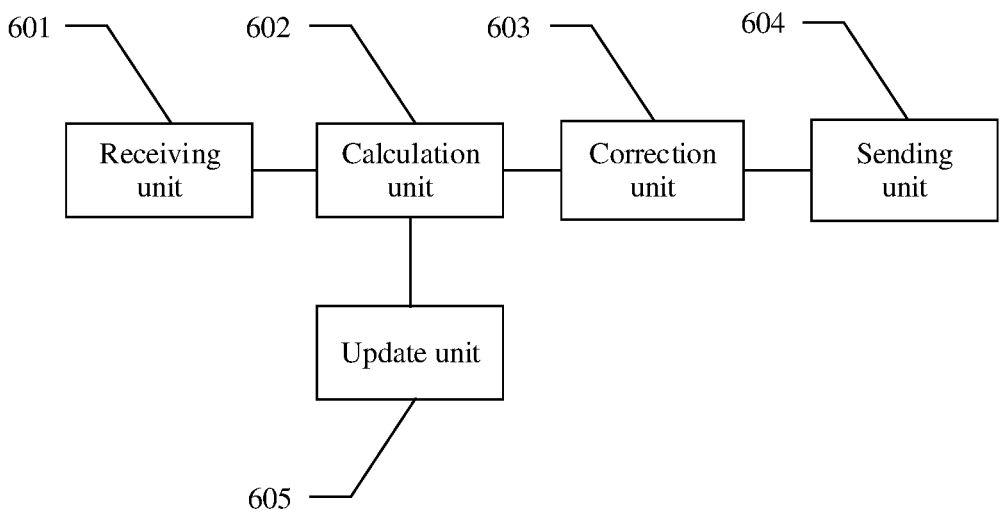
FIG. 6 is another schematic diagram of a structure of a service device according to an embodiment.

FIG. 6 is a schematic diagram of a structure of a service device according to another embodiment. The service device includes a receiving unit 601, a calculation unit 602, an update unit 605, and a sending unit 604.

The receiving unit 601 is configured to receive difference information uploaded by at least two clients, where the difference information uploaded by the client is difference information that is of a second model relative to a first model and obtained by the client through training based on the first model, the first model is received by the client from the service device, and the second model is obtained by the client through training based on the first model.

The calculation unit 602 is configured to perform calculation based on the difference information uploaded by the at least two clients, to obtain first difference consistency information, where the first difference consistency information indicates a consistency degree of the difference information uploaded by the at least two clients.

The update unit 605 is configured to update the first model based on the difference information uploaded by the at least two clients, to obtain a third model.

The calculation unit 602 is further configured to perform calculation based on the first difference consistency information, to obtain first training information, where the first training information is used to train the third model.

The sending unit 604 is configured to send the first training information and the third model to the at least two clients.

Optionally, the calculation unit 602 is configured to obtain the first difference consistency information through calculation according to the following formula:

$$GCR_t = \frac{\left| \sum_i g_i \right|}{\sum_i |g_i|}.$$

$GCR_t$ indicates the first difference consistency information, $g_i$ indicates difference information uploaded by an $i^{th}$ client in the at least two clients, and i is a positive integer greater than or equal to 1.

Optionally, the first training information includes at least one of a first quantity of training batches or a first learning rate, the first quantity of training batches is used by the client to determine a quantity of training batches and the first learning rate is used by the client to determine a training learning rate.

Optionally, if the first training information includes the first quantity of training batches, the first training information obtained by the calculation unit 602 through calculation based on the first difference consistency information meets the following condition:

$$\text{if } GCR_t < GCR_{t-1}, E_t < E_{t-1};$$

$$\text{if } GCR_t = GCR_{t-1}, E_t = E_{t-1}; \text{ or}$$

$$\text{if } GCR_t > GCR_{t-1}, E_t > E_{t-1}.$$

$GCR_{t-1}$ indicates second difference consistency information, the second difference consistency information is difference consistency information obtained by the service device through calculation before the service device obtains the first difference consistency information, $GCR_t$ indicates the first difference consistency information, $E_{t-1}$ indicates a second quantity of training batches, the second quantity of training batches indicates a quantity of training batches delivered by the service device to the client before the service device obtains the first quantity of training batches, and $E_t$ indicates the first quantity of training batches.

Optionally, if the first training information includes the first learning rate, the first training information obtained by the calculation unit 602 through calculation based on the first difference consistency information meets the following condition:

$$\text{if } GCR_t < GCR_{t-1}, lr_t < lr_{t-1};$$

$$\text{if } GCR_t = GCR_{t-1}, lr_t = lr_{t-1}; \text{ or}$$

$$\text{if } GCR_t > GCR_{t-1}, lr_t > lr_{t-1}.$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates a second learning rate, the second learning rate is a learning rate delivered by the service device to the client before the service device obtains the first learning rate, and $lr_t$ indicates the first learning rate.

Optionally, the calculation unit 602 is configured to perform calculation based on the first difference consistency information and first performance determining information, to obtain the first training information. The first performance determining information indicates a weight of a performance determining factor used when the service device calculates the first training information.

Optionally, the first performance determining information includes at least one of an accuracy weight and a communication cost weight, the accuracy weight indicates a weight of model accuracy set when the service device calculates the first training information, and the communication cost weight indicates a weight of a communication resource used when the service device calculates the first training information.

Optionally, if the first training information includes the first training batch information, and the first determining performance information includes the accuracy weight and the communication cost weight, the calculation unit 602 calculates the first quantity of training batches according to the following formula:

$$E_t = \begin{cases} \alpha \times \dfrac{E_{t-1}+a}{b} + \beta \times E_{t-1} & GCR_t < GCR_{t-1} \\ E_{t-1} & GCR_t = GCR_{t-1}. \\ c\alpha \times E_{t-1} + d\beta \times E_{t-1} & GCR_t > GCR_{t-1} \end{cases}$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $E_{t-1}$ indicates the second quantity of training batches, the second quantity of training batches indicates a quantity of training batches sent by the service device to the client last time, $E_t$ indicates the first training batch information, $\alpha$ indicates the accuracy weight, $\beta$ indicates the communication cost weight, and a, b, c, and d are positive numbers not greater than 6.

If $E_t$ obtained through calculation according to the formula is a non-positive integer, a value of $E_t$ is rounded to a positive integer.

Optionally, if the first training information includes the first learning rate, the calculation unit 602 obtains the first learning rate through calculation according to the following formula:

$$lr_t = \begin{cases} a_1\alpha \times lr_{t-1} + \beta \times lr_{t-1} & GCR_t < GCR_{t-1} \\ lr_{t-1} & GCR_t = GCR_{t-1}. \\ b_1\alpha \times lr_{t-1} + b_2\beta \times lr_{t-1} & GCR_t > GCR_{t-1} \end{cases}$$

$GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates the second learning rate, the second learning rate is a learning rate delivered by the service device to the client before the service device obtains the first learning rate, $lr_t$ indicates the first learning rate, $\alpha$ indicates the accuracy weight, $\beta$ indicates the communication cost weight, and $a_1$, $b_1$, and $b_2$ are positive numbers not greater than 6.

Optionally, the service device further includes:

a correction unit 603, configured to correct the first difference consistency information by using an exponential moving average method, to obtain corrected first difference consistency information.

Optionally, the calculation unit is configured to correct the first difference consistency information by using an exponential movement parameter according to the following formula:

$$GCR' = GCR_{t-1}*\Theta + GCR_t*(1-\Theta).$$

$GCR_{t-1}$ indicates the second difference consistency information, the second difference consistency information is difference consistency information obtained by the service device through calculation before the service device obtains the first difference consistency information, $GCR_t$ indicates the first difference consistency information, and $GCR'$ indicates the corrected first difference consistency information.

A value of $\Theta$ ranges from 0.9 to 0.99.

Optionally, the value of $\Theta$ is 0.95.

In this embodiment, operations performed by units of the service device are similar to those described in the method performed by the service device in the embodiment shown in FIG. 2 or FIG. 4 and are not described herein again.

Figure 7:
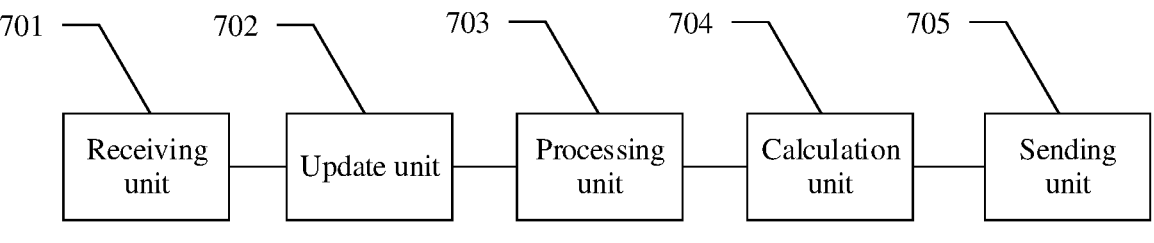
FIG. 7 is still another schematic diagram of a structure of a service device according to an embodiment.

FIG. 7 is a schematic diagram of a structure of a service device according to still another embodiment. The service device includes a receiving unit 701, an update unit 702, a processing unit 703, a calculation unit 704, and a sending unit 705.

The receiving unit 701 is configured to receive difference information uploaded by at least two clients, where the difference information uploaded by the client is difference information that is of a second model relative to a first model and obtained through training based on the first model, and the first model is received by the client from the service device.

The update unit 702 is configured to update the first model based on the difference information uploaded by the at least two clients, to obtain a third model.

The processing unit 703 is configured to obtain difference information (referred to as difference information of the service device) between the first model and the third model based on the first model and the third model.

The calculation unit 704 is configured to perform calculation based on the difference information of the serve device and difference information of a first client of the at least two clients, to obtain target difference consistency information, where the target difference consistency information indicates a consistency degree between the difference information of the service device model and difference information of a first client.

The calculation unit 704 is further configured to perform calculation based on the target difference consistency information, to obtain target training information, where the target training information is used to train the third model.

The sending unit 705 is configured to send the target training information and the third model to the first client.

In this embodiment, operations performed by units of the service device are similar to those described in the method performed by the service device in the embodiment shown in FIG. 3 and are not described herein again.

Figure 8:
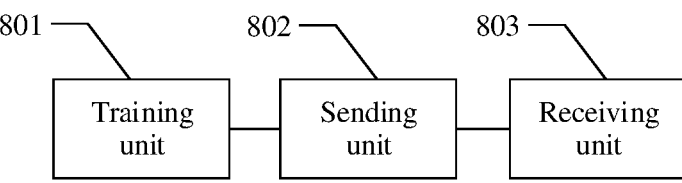
FIG. 8 is a schematic diagram of a structure of a client according to an embodiment.

FIG. 8 is a schematic diagram of a structure of a client according to another embodiment. The client includes a training unit 801, a sending unit 802, and a receiving unit 803.

The training unit 801 is configured to perform training based on a first model to obtain a second model, where the first model is received from a service device.

The sending unit 802 is configured to send difference information of the second model relative to the first model to the service device.

The receiving unit 803 is configured to receive a third model and first training information that are sent by the service device, where the third model is obtained by the service device by updating the first model based on difference information sent by the client and difference information sent by another client, and the first training information is obtained by the service device based on the difference information sent by the client and the difference information sent by the another client.

The training unit 801 is further configured to train the third model based on the first training information.

In this embodiment, operations performed by units of the client device are similar to those described in the method performed by the client in the embodiment shown in FIG. 2 or FIG. 4 and are not described herein again.

Figure 9:
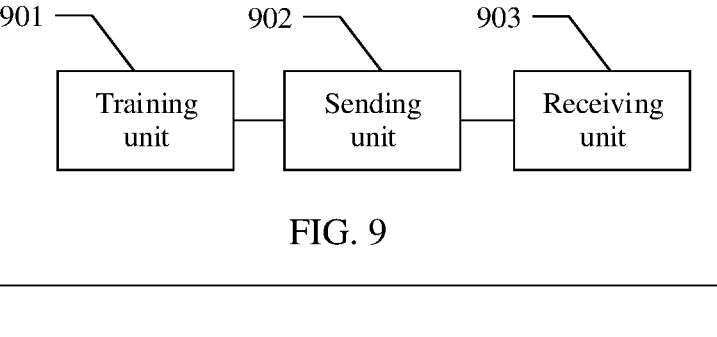
FIG. 9 is another schematic diagram of a structure of a client according to an embodiment.

FIG. 9 is a schematic diagram of a structure of a client according to another embodiment. The client includes a training unit 901, a sending unit 902, and a receiving unit 903.

The training unit 901 is configured to perform training based on a first model to obtain a second model, where the first model is received from a service device.

The sending unit 902 is configured to send difference information of the second model relative to the first model to the service device.

The receiving unit 903 is configured to receive a third model and first training information that are sent by the service device, where the third model is obtained by the service device by updating the first model based on difference information sent by the client and difference information sent by another client, and the first training information is obtained by the service device based on the difference information sent by the client and the difference information sent by the another client.

The training unit 901 is further configured to train the third model based on the first training information.

Optionally, the first training information includes at least one of a first quantity of training batches or a first learning rate, the first quantity of training batches is used by the client to determine a quantity of training batches and the first learning rate is used by the client to determine a training learning rate.

Optionally, the client is a site analysis device.

The training unit 901 is further configured to train the third model based on the first training information and a first training sample, to obtain a fourth model. The first training sample includes feature data of a network device of a site network corresponding to the site analysis device.

In this embodiment, operations performed by units of the client device are similar to those described in the method performed by the client in the embodiment shown in FIG. 2 or FIG. 4 and are not described herein again.

Figure 10:
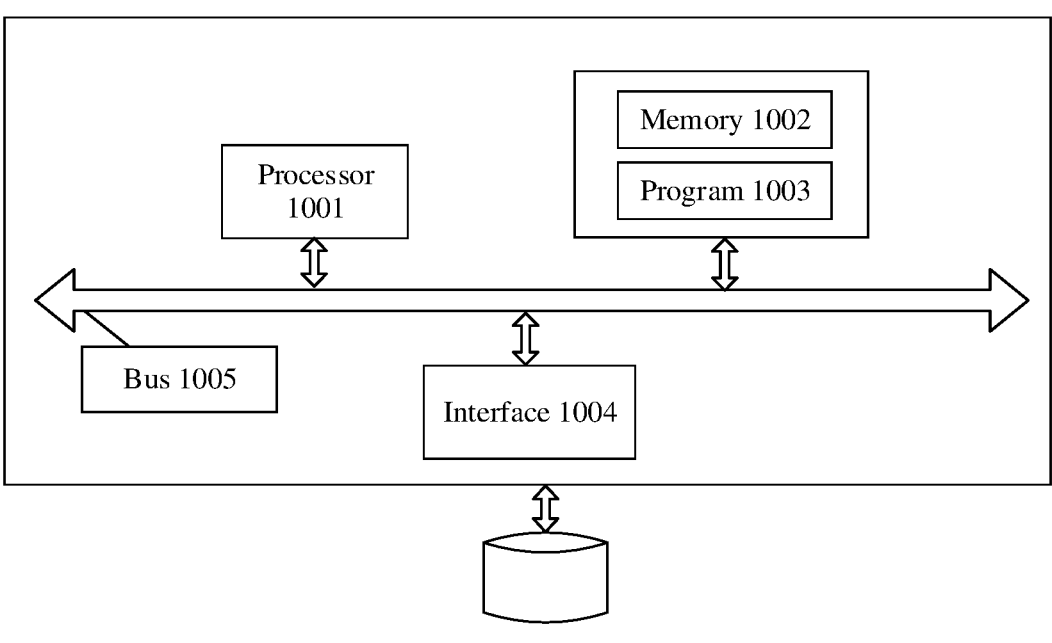
FIG. 10 is still another schematic diagram of a structure of a client according to an embodiment.

FIG. 10 is a schematic diagram of a structure of a client according to still another embodiment.

The client includes a processor 1001, a memory 1002, a bus 1005, and an interface 1004. The processor 1001 is connected to the memory 1002 and the interface 1004. The bus 1005 is separately connected to the processor 1001, the memory 1002, and the interface 1004. The interface 1004 is configured to receive or send data. The processor 1001 is a single-core or multi-core central processing unit, or an application-specific integrated circuit, or one or more integrated circuits configured to implement this embodiment. The memory 1002 may be a random access memory (RAM), or may be a non-volatile memory, for example, at least one hard disk memory. The memory 1002 is configured to store a computer-executable instruction. The computer-executable instruction may include a program 1003.

In this embodiment, the processor 1001 may perform the operations performed by the client in the embodiment shown in FIG. 2 or FIG. 4. Details are not described herein again.

Figure 11:
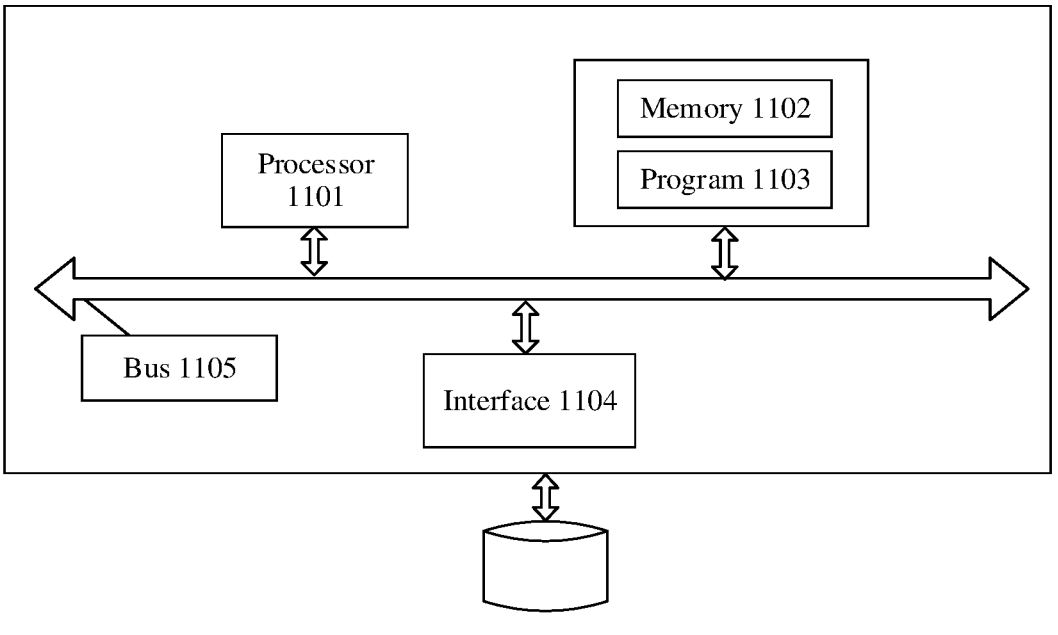
FIG. 11 is yet still another schematic diagram of a structure of a service device according to an embodiment.

FIG. 11 is a schematic diagram of a structure of a service device according to another embodiment.

The service device includes a processor 1101, a memory 1102, a bus 1105, and an interface 1104. The processor 1101 is connected to the memory 1102 and the interface 1104. The bus 1105 is separately connected to the processor 1101, the memory 1102, and the interface 1104. The interface 1104 is configured to receive or send data. The processor 1101 is a single-core or multi-core central processing unit, or an application-specific integrated circuit, or one or more integrated circuits configured to implement this embodiment. The memory 1102 may be a RAM, or may be a non-volatile memory, for example, at least one hard disk memory. The memory 1102 is configured to store a computer-executable instruction. The computer-executable instruction may include a program 1103.

In this embodiment, the processor 1101 may perform the operations performed by the service device in the embodiment shown in FIG. 3. Details are not described herein again.

An embodiment further provides a computer-readable storage medium, and the computer-readable storage medium stores a computer program. When the computer program is executed by a computer, a method procedure related to the service device in any one of the foregoing method embodiments is implemented.

It should be understood that the processor mentioned in the service device in the foregoing embodiments, or the processor provided in the foregoing embodiments may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that there may be one or more processors in the service device in embodiments, which may be adjusted based on an actual application scenario. This is merely an example for description herein and does not constitute a limitation. There may be one or more memories in the embodiments, which may be adjusted based on an actual application scenario. This is merely an example for description herein and does not constitute a limitation.

It should be further understood that the memory, the readable storage medium, or the like in the service device mentioned in the embodiments may be a volatile memory or a nonvolatile memory or may include a volatile memory and a nonvolatile memory. The nonvolatile memory may be a ROM, a programmable read-only memory (PROM), an erasable programmable read-only memory (EPROM), an electrically erasable programmable read-only memory (EE-PROM), or a flash memory. The volatile memory may be a RAM that is used as an external buffer. For example, instead of a limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be further noted that, when the service device includes a processor (or a processing unit) and a memory, the processor may be integrated with the memory, or the processor and the memory may be connected by using an interface. This may be adjusted based on an actual application scenario and is not limited.

An embodiment further provides a computer program or a computer program product including a computer program. When the computer program is executed on a computer, the computer is enabled to implement the method procedure of the service device in any one of the foregoing method embodiments.

All or some of the foregoing embodiments in FIG. 2 to FIG. 4 may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, the procedure or functions according to embodiments are all or partially generated. The computer may be a general-purpose computer, a dedicated computer, a computer network, or another programmable apparatus. The computer instructions may be stored in the computer-readable storage medium or may be transmitted from one computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

A person skilled in the art may clearly understand that, for convenient and brief description, for detailed working processes of the foregoing system, apparatus, and unit, refer to corresponding processes in the foregoing method embodiments. Details are not described herein again.

In the several embodiments, the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments may be integrated into one processing unit, or each of the units may exist alone physically, or two or more units may be integrated into one unit. The integrated unit may be implemented in a form of hardware or may be implemented in a form of a software function unit.

When the integrated unit is implemented in the form of the software function unit and sold or used as an independent product, the integrated unit may be stored in a computer-readable storage medium. Based on such an understanding, the solutions essentially, or the part contributing to the current technology, or all or some of the solutions may be implemented in the form of a software product. The computer software product is stored in a storage medium and includes several instructions for instructing a computer device (which may be a personal computer, a server, or another service device) to perform all or some of the steps of the methods in the embodiments in FIG. 2 to FIG. 6. The storage medium includes various media that can store the program code, such as a USB flash drive, a removable hard disk, a ROM, a RAM, a magnetic disk, or an optical disc.

In the embodiments and the accompanying drawings, the terms "first", "second", and the like are intended to distinguish similar objects but do not necessarily indicate an order or sequence. It should be understood that the terms used in such a way are interchangeable in proper circumstances, and this is merely a discrimination manner for describing objects having a same attribute in the embodiments. In addition, the terms "include", "have" and any other variants mean to cover the non-exclusive inclusion, so that a process, method, system, product, or device that includes a series of units is not necessarily limited to those units but may include other units not expressly listed or inherent to such a process, method, product, or device.

Names of messages/frames/information, modules, units, or the like provided in the embodiments are merely examples, and other names may be used provided that the messages/frames/information, modules, units, or the like have same functions.

The terms used in the embodiments are merely for the purpose of illustrating the embodiments and are not intended as limiting. Terms "a", "the", and "this" of singular forms used in the embodiments are also intended to include plural forms, unless otherwise specified in a context clearly. It should be further understood that, in the descriptions, "I" indicates an "or" relationship between associated objects unless otherwise specified. For example, A/B may represent A or B. The term "and/or" is merely an association relationship between associated objects and indicates that three relationships may exist. For example, A and/or B may represent the following three cases: only A exists, both A and B exist, and only B exists, where A and B each may be singular or plural.

Depending on the context, for example, words if used herein may be explained as "while" or "when" or "in response to determining" or "in response to detection". Similarly, according to the context, a phrase "if it is determined that" or "if (a stated condition or event) is detected" may be interpreted as a meaning of "when it is determined that", "in response to determining", "when (a stated condition or event) is detected", or "in response to detecting (a stated condition or event)".

In conclusion, the foregoing embodiments are merely intended for describing the solutions, but not for limiting the embodiments. Although described in detail with reference to the foregoing embodiments, persons of ordinary skill in the art should understand that they may still make modifications to the solutions described in the foregoing embodiments or make equivalent replacements to some features thereof, without departing from the scope of the embodiments.

What is claimed is:

1. A method for implementing model update, comprising:
receiving, by a service device having at least one processor implemented either on a server or a cloud, difference information uploaded by at least two clients, wherein difference information uploaded by a client of the at least two clients is the difference information that is of a second model relative to a first model and obtained by the client through training based on the first model, the first model is received by the client from the service device, and the second model is obtained by the client through training based on the first model;
performing, by the service device, calculation based on the difference information uploaded by the at least two clients, to obtain first difference consistency information, wherein the first difference consistency information indicates a consistency degree of the difference information uploaded by the at least two clients, wherein the service device obtains the first difference consistency information through calculation according to the following formula:

$$GCR_t = \frac{\left|\sum_i g_i\right|}{\sum_i |g_i|},$$

wherein
GCR$_t$ indicates the first difference consistency information, g$_i$ indicates difference information uploaded by an i$^{th}$ client of the at least two clients, and i is a positive integer greater than or equal to 1;
updating, by the service device, the first model based on the difference information uploaded by the at least two clients, to obtain a third model;
performing, by the service device, calculation based on the first difference consistency information, to obtain first training information, wherein the first training information is used to train the third model; and
sending, by the service device, the first training information and the third model to the at least two clients.

2. The method for implementing model update according to claim 1, wherein the first training information comprises at least one of a first quantity of training batches or a first learning rate, the first quantity of training batches is used by the client to determine a quantity of training batches, and the first learning rate is used by the client to determine a training learning rate.

3. The method for implementing model update according to claim 2, wherein, when the first training information comprises the first quantity of training batches, the first training information obtained by the service device through calculation based on the first difference consistency information meets the following condition:

when $GCR_t < GCR_{t-1}, E_t < E_{t-1}$;

when $GCR_t = GCR_{t-1}, E_t = E_{t-1}$; or when $GCR_t > GCR_{t-1}, E_t > E_{t-1}$, wherein GCR$_{t-1}$ indicates second difference consistency information, the second difference consistency information is difference consistency information obtained by the service device through calculation before the service device obtains the first difference consistency information, GCR$_t$ indicates the first difference consistency information, E$_{t-1}$ indicates a second quantity of training batches, the second quantity of training batches indicates a quantity of training batches delivered by the service device to the client before the service device obtains the first quantity of training batches, and E$_t$ indicates the first quantity of training batches.

4. The method for implementing model update according to claim 3, wherein performing, by the service device, the calculation based on the first difference consistency information to obtain the first training information further comprises:
performing, by the service device, calculation based on the first difference consistency information and first performance determining information, to obtain the first training information, wherein the first performance determining information indicates a weight of a performance determining factor used when the service device calculates the first training information.

5. The method for implementing model update according to claim 4, wherein the first performance determining information comprises at least one of an accuracy weight and a communication cost weight, the accuracy weight indicates a weight of model accuracy set when the service device calculates the first training information, and the communication cost weight indicates a weight of a communication resource used when the service device calculates the first training information.

6. The method for implementing model update according to claim 5, wherein, when the first training information comprises the first quantity of training batches, and the first determining performance information comprises the accuracy weight and the communication cost weight, the service device obtains the first quantity of training batches through calculation according to the following formula:

$$
E_t = \begin{cases} \alpha \times \dfrac{E_{t-1} + a}{b} + \beta \times E_{t-1} & GCR_t < GCR_{t-1} \\ E_{t-1} & GCR_t = GCR_{t-1}, \\ c\alpha \times E_{t-1} + d\beta \times E_{t-1} & GCR_t > GCR_{t-1} \end{cases}
$$

wherein $GCR_{t-1}$ indicates the second difference consistency information, the second difference consistency information is difference consistency information obtained by the service device through calculation before the service device obtains the first difference consistency information, $GCR_t$ indicates the first difference consistency information, $E_{t-1}$ indicates the second training batch information, the second quantity of training batches indicates a quantity of training batches sent by the service device to the client last time, $E_t$ indicates the first quantity of training batches, $\alpha$ indicates the accuracy weight, $\beta$ indicates the communication cost weight, and a, b, c, and d are positive numbers not greater than 6; and when $E_t$ obtained through calculation according to the formula is a non-positive integer, a value of $E_t$ is rounded to a positive integer.

7. The method for implementing model update according to claim 2, wherein when the first training information comprises the first learning rate, the first training information obtained by the service device through calculation based on the first difference consistency information meets the following condition:

when $GCR_t < GCR_{t-1}, lr_t < lr_{t-1}$;

when $GCR_t = GCR_{t-1}, lr_t = lr_{t-1}$; or when $GCR_t > GCR_{t-1}, lr_t > lr_{t-1}$, wherein $GCR_{t-1}$ indicates the second difference consistency information, the second difference consistency information is difference consistency information obtained by the service device through calculation before the service device obtains the first difference consistency information, $GCR_t$ indicates the first difference consistency information, $lr_{t-1}$ indicates a second learning rate, the second learning rate is a learning rate delivered by the service device to the client before the service device obtains the first learning rate, and $lr_t$ indicates the first learning rate.

8. The method for implementing model update according to claim 5, wherein, when the first training information comprises the first learning rate, the service device obtains the first learning rate through calculation according to the following formula:

$$
lr_t = \begin{cases} a_1\alpha \times lr_{t-1} + \beta \times lr_{t-1} & GCR_t < GCR_{t-1} \\ lr_{t-1} & GCR_t = GCR_{t-1}, \\ b_1\alpha \times lr_{t-1} + b_2\beta \times lr_{t-1} & GCR_t > GCR_{t-1} \end{cases}
$$

wherein $GCR_{t-1}$ indicates the second difference consistency information, the second difference consistency information is difference consistency information obtained by the service device through calculation before the service device obtains the first difference consistency information, $GCR_t$ indicates the first difference consistency information, $Ir_{t-1}$ indicates the second learning rate, the second learning rate is a learning rate delivered by the service device to the client before the service device obtains the first learning rate, $Ir_t$ indicates the first learning rate, $\alpha$ indicates the accuracy weight, $\beta$ indicates the communication cost weight, and $a_1$, $b_1$, and $b_2$ are positive numbers not greater than 6.

9. The method for implementing model update according to claim 8, wherein the second learning rate is delivered by the cloud.

10. The method for implementing model update according to claim 1, wherein after performing, by the service device, the calculation based on the difference information to obtain the first difference consistency information, the method further comprises:

correcting, by the service device, the first difference consistency information by using an exponential moving average method, to obtain corrected first difference consistency information.

11. A method for implementing model update, comprising:

performing, by a client, training based on a first model, to obtain a second model, wherein the first model is received from a service device having at least one processor implemented either on a server or a cloud, wherein the service device obtains a first difference consistency information through calculation according to the following formula:

$$
GCR_t = \frac{\left| \sum_i g_i \right|}{\sum_i |g_i|},
$$

wherein $GCR_t$ indicates the first difference consistency information, $g_i$ indicates difference information uploaded by an $i^{th}$ client of the at least two clients, and i is a positive integer greater than or equal to 1;

sending, by the client, difference information of the second model relative to the first model to the service device;

receiving, by the client, a third model and first training information that are sent by the service device, wherein the third model is obtained by the service device by updating the first model based on the difference information sent by the client and difference information sent by another client, and the first training information is obtained by the service device based on the difference information sent by the client and the difference information sent by the another client; and training, by the client, the third model based on the first training information.

12. The method for implementing model update according to claim 11, wherein the first training information comprises at least one of a first quantity of training batches or a first learning rate, the first quantity of training batches is used to determine a quantity of training batches, and the first learning rate is used to determine a training learning rate.

13. A service device comprising:

at least one processor, the service device is implemented either on a server or a cloud; and a memory, coupled to the at least one processor and configured to store instructions that when executed by the at least one processor cause the service device to:

receive difference information uploaded by at least two clients, wherein difference information uploaded by a client of the at least two clients is difference information that is of a second model relative to a first model and obtained by the client through training based on the first model, the first model is received by the client from the service device, and the second model is obtained by the client through training based on the first model;

perform calculation based on the difference information uploaded by the at least two clients, to obtain first difference consistency information, wherein the first difference consistency information indicates a consistency degree of the difference information uploaded by the at least two clients, wherein the service device obtains the first difference consistency information through calculation according to the following formula:

$$GCR_t = \frac{\left|\sum_i g_i\right|}{\sum_i |g_i|},$$

wherein

GCR$_t$ indicates the first difference consistency information, $g_i$ indicates difference information uploaded by an $i^{th}$ client of the at least two clients, and i is a positive integer greater than or equal to 1;

update the first model based on the difference information uploaded by the at least two clients, to obtain a third model;

perform calculation based on the first difference consistency information, to obtain first training information, wherein the first training information is used to train the third model; and send the first training information and the third model to the at least two clients.

14. The service device according to claim 13, wherein the first training information comprises at least one of a first quantity of training batches or a first learning rate, the first quantity of training batches is used by the client to determine a quantity of training batches, and the first learning rate is used by the client to determine a training learning rate.

15. The service device according to claim 14, wherein, when the first training information comprises the first quantity of training batches, the first training information obtained through calculation based on the first difference consistency information meets the following condition:

when $GCR_t < GCR_{t-1}, E_t < E_{t-1}$;

when $GCR_t = GCR_{t-1}, E_t = E_{t-1}$; or when $GCR_t > GCR_{t-1}, E_t > E_{t-1}$, wherein GCR$_{t-1}$ indicates second difference consistency information, the second difference consistency information is difference consistency information obtained by the service device through calculation before the service device obtains the first difference consistency information, GCR$_t$ indicates the first difference consistency information, E$_{t-1}$ indicates a second quantity of training batches, the second quantity of training batches indicates a quantity of training batches delivered by the service device to the client before the service device obtains the first quantity of training batches, and E$_t$ indicates the first quantity of training batches.

16. The service device according to claim 14, wherein, when the first training information comprises the first learning rate, the first training information obtained through calculation based on the first difference consistency information meets the following condition:

when $GCR_t < GCR_{t-1}, Ir_t < Ir_{t-1}$;

when $GCR_t = GCR_{t-1}, Ir_t = Ir_{t-1}$; or when $GCR_t > GCR_{t-1}, Ir_t > Ir_{t-1}$, wherein GCR$_{t-1}$ indicates the second difference consistency information, the second difference consistency information is difference consistency information obtained by the service device through calculation before the service device obtains the first difference consistency information, GCR$_t$ indicates the first difference consistency information, Ir$_{t-1}$ indicates a second learning rate, the second learning rate is learning rate information delivered by the service device to the client before the service device obtains the first learning rate, and Ir$_t$ indicates the first learning rate.

17. The service device according to claim 16, wherein the second learning rate is delivered by the cloud.

18. The service device according to claim 14, wherein, when executed by the at least one processor, the instructions further cause the service device to obtain, through calculation, the first training information based on the first difference consistency information and first performance determining information, and the first performance determining information indicates a weight of a performance determining factor used when the service device calculates the first training information.

19. The service device according to claim 18, wherein the first performance determining information comprises at least one of an accuracy weight and a communication cost weight, the accuracy weight indicates a weight of model accuracy set when the service device calculates the first training information, and the communication cost weight indicates a weight of a communication resource used when the service device calculates the first training information.

20. The service device according to claim 13, wherein, when executed by the at least one processor, the instructions further cause the service device to correct the first difference consistency information by using an exponential moving average method to obtain corrected first difference consistency information.

* * * * *